(12) United States Patent
Turiello et al.

(10) Patent No.: US 12,418,633 B2
(45) Date of Patent: Sep. 16, 2025

(54) METHODS AND SYSTEM OF INCIDENT BASED CAMERA DEVICE ACTIVATION IN A FIREFIGHTER AIR REPLENISHMENT SYSTEM HAVING BREATHABLE AIR SUPPLIED THEREIN

(71) Applicant: RESCUE AIR SYSTEMS, INC., San Carlos, CA (US)

(72) Inventors: Nikolas Turiello, San Carlos, CA (US); Anthony J. Turiello, Westlake, TX (US)

(73) Assignee: Rescue Air Systems, Inc., San Carlos, CA (US)

( * ) Notice: Subject to any disclaimer, the term of this patent is extended or adjusted under 35 U.S.C. 154(b) by 181 days.

(21) Appl. No.: 18/207,144

(22) Filed: Jun. 8, 2023

(65) Prior Publication Data
US 2023/0319241 A1 Oct. 5, 2023

Related U.S. Application Data

(60) Provisional application No. 63/413,616, filed on Oct. 6, 2022, provisional application No. 63/359,882, filed
(Continued)

(51) Int. Cl.
*G08B 21/22* (2006.01)
*A62B 27/00* (2006.01)
(Continued)

(52) U.S. Cl.
CPC ............ *H04N 7/188* (2013.01); *A62B 27/00* (2013.01); *G16Y 40/50* (2020.01)

(58) Field of Classification Search
USPC ......... 340/540, 545.2, 530, 539.1, 435, 474, 340/488, 539.22, 568.1
See application file for complete search history.

(56) References Cited

U.S. PATENT DOCUMENTS 2,341,113 A   2/1944   Nelson
3,925,763 A   12/1975  Wadhwani et al.
(Continued)

FOREIGN PATENT DOCUMENTS

AR        070623 A1     4/2010
AU    2019101454 A4     1/2020
(Continued)

OTHER PUBLICATIONS

"Influence of Internal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.
(Continued)

*Primary Examiner* — Daniel Previl
(74) *Attorney, Agent, or Firm* — Foley & Lardner LLP

(57) ABSTRACT

Disclosed are methods and/or a system of incident based camera device activation in a safety system of a structure having a fixed piping system implemented therein to supply breathable air thereacross. In accordance therewith, one or more sensor(s) associated with one or more component(s) of the safety system is integrated with a computing platform executing on a data processing device. Based on the integration of the one or more sensor(s) with the computing platform, one or more environmental parameter(s) of the one or more component(s) of the safety system is sensed. One or more camera device(s) in a vicinity of and/or on the one or more component(s) of the safety system is automatically activated based on determining, from the sensing, occurrence of an incident.

20 Claims, 9 Drawing Sheets

Related U.S. Application Data on Jul. 11, 2022, provisional application No. 63/357,743, filed on Jul. 1, 2022, provisional application No. 63/357,754, filed on Jul. 1, 2022, provisional application No. 63/356,996, filed on Jun. 29, 2022.

(51) Int. Cl.
*H04N 7/18* (2006.01)
*G16Y 40/50* (2020.01)

(56) References Cited

U.S. PATENT DOCUMENTS

| | | |
|---|---|---|
| 4,023,146 A | 5/1977 | Carroll |
| 4,091,874 A | 5/1978 | Monma |
| 4,336,590 A | 6/1982 | Jaco et al. |
| 4,373,522 A | 2/1983 | Zien |
| 4,375,637 A | 3/1983 | Desjardins |
| 4,467,796 A | 8/1984 | Beagley |
| 4,570,719 A | 2/1986 | Wilk |
| 4,856,565 A | 8/1989 | Schoeffl et al. |
| 5,163,422 A | 11/1992 | Burgess |
| 5,396,885 A | 3/1995 | Nelson |
| 5,497,855 A | 3/1996 | Moore |
| 5,507,283 A | 4/1996 | Grivas |
| 5,538,690 A | 7/1996 | Greer et al. |
| 5,564,626 A | 10/1996 | Kettler et al. |
| 5,570,685 A | 11/1996 | Turiello |
| 5,707,005 A | 1/1998 | Kettler et al. |
| 5,720,659 A | 2/1998 | Wicks |
| 5,800,260 A | 9/1998 | Kao |
| 5,992,532 A | 11/1999 | Ramsey et al. |
| 6,112,807 A | 9/2000 | Dage |
| 6,310,552 B1 | 10/2001 | Stumberg et al. |
| 6,357,532 B1 | 3/2002 | Laskaris et al. |
| 6,369,716 B1 | 4/2002 | Abbas et al. |
| 6,401,487 B1 | 6/2002 | Kotliar |
| 6,418,752 B2 | 7/2002 | Kotliar |
| 6,488,026 B2 | 12/2002 | Lauer |
| 6,502,421 B2 | 1/2003 | Kotliar |
| 6,543,444 B1 | 4/2003 | Lewis |
| 6,585,583 B1 | 7/2003 | Chan |
| 6,647,301 B1 | 11/2003 | Sederlund et al. |
| 6,712,071 B1 | 3/2004 | Parker |
| 6,810,910 B2 | 11/2004 | McHugh |
| 6,832,952 B2 | 12/2004 | Faltesek et al. |
| 6,866,102 B2 | 3/2005 | Boyce et al. |
| 6,873,256 B2 | 3/2005 | Pedersen et al. |
| 6,920,874 B1 | 7/2005 | Siegel |
| 6,940,403 B2 | 9/2005 | Kail et al. |
| 6,999,562 B2 | 2/2006 | Winick |
| 7,091,852 B2 | 8/2006 | Mason et al. |
| 7,124,833 B2 | 10/2006 | Sant'Angelo |
| 7,161,481 B2 | 1/2007 | Turner |
| 7,168,428 B1 | 1/2007 | Zoha |
| 7,186,084 B2 | 3/2007 | Bunker et al. |
| 7,221,260 B2 | 5/2007 | Berezowski et al. |
| 7,250,000 B2 | 7/2007 | Daniels |
| 7,302,313 B2 | 11/2007 | Sharp et al. |
| 7,347,204 B1 | 3/2008 | Lindsey et al. |
| 7,377,835 B2 | 5/2008 | Parkulo et al. |
| 7,468,082 B2 | 12/2008 | Gordon |
| 7,509,968 B2 | 3/2009 | Surawski |
| 7,527,056 B2 | 5/2009 | Turiello |
| 7,548,833 B2 | 6/2009 | Ahmed |
| 7,598,856 B1 | 10/2009 | Nick et al. |
| 7,621,269 B2 | 11/2009 | Turiello |
| 7,654,279 B2 | 2/2010 | Horton et al. |
| 7,658,190 B1 | 2/2010 | Phifer et al. |
| 7,673,629 B2 | 3/2010 | Turiello |
| 7,677,247 B2 | 3/2010 | Turiello |
| 7,694,678 B2 | 4/2010 | Turiello |
| 7,710,282 B1 | 5/2010 | Young |
| 7,765,072 B2 | 7/2010 | Eiler et al. |
| 7,770,610 B2 | 8/2010 | Lisle |
| 7,804,402 B2 | 9/2010 | Lang et al. |
| 7,817,050 B2 | 10/2010 | Goodman et al. |
| 7,823,609 B2 | 11/2010 | Wonders |
| 7,857,068 B2 | 12/2010 | Wagner |
| 7,880,607 B2 | 2/2011 | Olson et al. |
| 7,921,869 B2 | 4/2011 | Surawski |
| 7,934,411 B2 | 5/2011 | Koch |
| 7,953,228 B2 | 5/2011 | Faltesek et al. |
| 7,975,729 B2 | 7/2011 | Lisle |
| 8,074,278 B2 | 12/2011 | Law et al. |
| 8,114,954 B2 | 2/2012 | DeBruin |
| 8,116,913 B2 | 2/2012 | Mirpourian et al. |
| 8,147,302 B2 | 4/2012 | Desrochers et al. |
| 8,149,109 B2 | 4/2012 | Lontka |
| 8,219,249 B2 | 7/2012 | Harrod et al. |
| 8,291,941 B1 | 10/2012 | Berardi |
| 8,371,295 B2 | 2/2013 | Turiello |
| 8,375,876 B2 | 2/2013 | Van Tassel |
| 8,375,948 B2 | 2/2013 | Turiello |
| 8,381,726 B2 | 2/2013 | Turiello |
| 8,413,653 B2 | 4/2013 | Turiello |
| 8,443,800 B2 | 5/2013 | Turiello |
| 8,517,696 B2 | 8/2013 | McLoughlin et al. |
| 8,538,687 B2 | 9/2013 | Plocher et al. |
| 8,573,317 B2 | 11/2013 | Krüger et al. |
| 8,602,119 B2 | 12/2013 | Wagner |
| 8,611,323 B2 | 12/2013 | Berger et al. |
| 8,668,023 B2 | 3/2014 | Wilkins et al. |
| 8,701,718 B1 | 4/2014 | Turiello |
| 8,733,355 B2 | 5/2014 | Turiello |
| 8,745,792 B2 | 6/2014 | McGlynn |
| 8,755,839 B2 | 6/2014 | Parkulo et al. |
| 8,770,190 B2 | 7/2014 | Doherty et al. |
| 8,773,946 B2 | 7/2014 | Padmanabhan et al. |
| 8,795,041 B2 | 8/2014 | Saito et al. |
| 8,797,141 B2 | 8/2014 | Best et al. |
| 8,797,210 B2 | 8/2014 | Derrick et al. |
| 8,866,618 B2 | 10/2014 | Cotten et al. |
| 8,995,946 B2 | 3/2015 | Miller |
| 9,010,019 B2 | 4/2015 | Mittelmark |
| 9,032,994 B2 | 5/2015 | McHugh et al. |
| 9,033,061 B2 | 5/2015 | Chattaway et al. |
| 9,105,171 B2 | 8/2015 | Flood et al. |
| 9,109,981 B2 | 8/2015 | Sharp |
| 9,175,975 B2 | 11/2015 | Shtukater |
| 9,220,937 B2 | 12/2015 | Wagner |
| 9,234,661 B2 | 1/2016 | Young et al. |
| 9,235,975 B2 | 1/2016 | Gettings et al. |
| 9,242,126 B2 * | 1/2016 | Turiello ............... A62B 15/00 |
| 9,243,753 B2 | 1/2016 | Wonders |
| 9,328,936 B2 | 5/2016 | Meirav et al. |
| 9,347,677 B2 | 5/2016 | Eberlein et al. |
| 9,404,666 B2 | 8/2016 | Terlson et al. |
| 9,466,199 B2 | 10/2016 | McNabb et al. |
| 9,468,157 B2 | 10/2016 | Hu |
| 9,564,028 B2 | 2/2017 | Cerrano |
| 9,566,608 B2 | 2/2017 | Tran |
| 9,670,670 B2 | 6/2017 | Teron |
| 9,671,794 B1 | 6/2017 | Lymberopoulos et al. |
| 9,682,257 B2 | 6/2017 | Zhao et al. |
| 9,702,802 B2 | 7/2017 | Ajay et al. |
| 9,724,484 B2 | 8/2017 | Robey |
| 9,733,149 B2 | 8/2017 | Eberlein |
| 9,829,895 B2 | 11/2017 | McLoughlin et al. |
| 9,852,604 B2 | 12/2017 | Poder |
| 9,875,631 B2 | 1/2018 | Mittleman et al. |
| 9,927,066 B1 | 3/2018 | Wonders |
| 9,933,115 B2 | 4/2018 | Rado et al. |
| 9,964,470 B2 | 5/2018 | Sharp |
| 10,042,164 B2 | 8/2018 | Kuutti et al. |
| 10,044,857 B2 | 8/2018 | Philbin |
| 10,052,509 B2 | 8/2018 | Wagner |
| 10,062,233 B1 | 8/2018 | Rogers et al. |
| 10,074,295 B2 | 9/2018 | Hyman |
| 10,078,865 B2 | 9/2018 | Joshi et al. |
| 10,121,361 B2 * | 11/2018 | Deluliis ............... G08B 21/10 |
| 10,124,196 B2 | 11/2018 | Roberts |
| 10,139,282 B2 | 11/2018 | Chrostowski |
| 10,156,320 B2 | 12/2018 | Toelle |
| 10,192,411 B2 | 1/2019 | Wedig et al. |

(56) References Cited

U.S. PATENT DOCUMENTS

| | | | |
|---|---|---|---|
| 10,311,444 B1 | 6/2019 | Conboy |
| 10,380,862 B1 | 8/2019 | Heidary |
| 10,380,863 B2 | 8/2019 | Wedig et al. |
| 10,400,442 B2 | 9/2019 | Power et al. |
| 10,417,451 B2 | 9/2019 | Park et al. |
| 10,426,064 B2 | 9/2019 | Slessman et al. |
| 10,490,055 B2 | 11/2019 | Myllymäki |
| 10,503,180 B2 | 12/2019 | Blackley |
| 10,529,215 B2 | 1/2020 | Brown |
| 10,563,886 B2 | 2/2020 | McCormick et al. |
| 10,639,508 B2 | 5/2020 | Müller et al. |
| 10,738,943 B2 | 8/2020 | Tilhof |
| 10,767,803 B2 | 9/2020 | Leahy |
| 10,789,665 B2 | 9/2020 | Comello |
| 10,808,396 B2 | 10/2020 | Zhang et al. |
| 10,834,482 B2 | 11/2020 | Speicher et al. |
| 10,890,294 B2 | 1/2021 | Santos et al. |
| 10,901,373 B2 | 1/2021 | Locke et al. |
| 10,969,131 B2 | 4/2021 | Sinha et al. |
| 11,009,186 B2 | 5/2021 | Sung |
| 11,027,236 B2 | 6/2021 | Maayan et al. |
| 11,055,973 B2 | 7/2021 | Wedig et al. |
| 11,070,390 B2 | 7/2021 | Park et al. |
| 11,111,767 B2 | 9/2021 | Anders |
| 11,135,461 B2 | 10/2021 | Beechy et al. |
| 11,162,181 B2 | 11/2021 | Harano et al. |
| 11,181,875 B2 | 11/2021 | Kummer et al. |
| 11,185,650 B2 | 11/2021 | Almqvist |
| 11,187,223 B2 | 11/2021 | Ward et al. |
| 11,191,222 B2 | 12/2021 | Cho et al. |
| 11,226,604 B2 | 1/2022 | Goyal |
| 11,238,187 B2 | 2/2022 | Nikolayev et al. |
| 11,391,474 B2 | 7/2022 | Eplee |
| 11,410,539 B2 | 8/2022 | Kasiviswanathan |
| 11,439,856 B2 | 9/2022 | Laskaris et al. |
| 11,514,764 B2 | 11/2022 | Correnti et al. |
| 11,536,476 B2 | 12/2022 | Nesier et al. |
| 2002/0121381 A1 | 9/2002 | Reilly |
| 2002/0185283 A1 | 12/2002 | Taylor |
| 2003/0183300 A1 | 10/2003 | Siebert |
| 2006/0005880 A1 | 1/2006 | Baker et al. |
| 2006/0173579 A1 | 8/2006 | Desrochers et al. |
| 2006/0234621 A1 | 10/2006 | Desrochers et al. |
| 2007/0163578 A1 | 7/2007 | Lisle |
| 2007/0175470 A1 | 8/2007 | Brookman et al. |
| 2008/0041377 A1 | 2/2008 | Turiello |
| 2008/0041378 A1 | 2/2008 | Turiello |
| 2008/0041379 A1 | 2/2008 | Turiello |
| 2008/0105443 A1 | 5/2008 | Molz et al. |
| 2008/0236846 A1 | 10/2008 | Gamble et al. |
| 2009/0159365 A1 | 6/2009 | O'Brien |
| 2009/0178675 A1 | 7/2009 | Turiello |
| 2010/0031955 A1 | 2/2010 | Turiello |
| 2010/0032040 A1 | 2/2010 | Turiello |
| 2010/0081411 A1 | 4/2010 | Montenero |
| 2010/0147297 A1 | 6/2010 | Brewer et al. |
| 2010/0154922 A1 | 6/2010 | Turiello |
| 2010/0201536 A1 | 8/2010 | Robertson et al. |
| 2011/0187524 A1 | 8/2011 | Cochran, III |
| 2011/0192479 A1 | 8/2011 | Yokota |
| 2011/0259580 A1 | 10/2011 | Head |
| 2011/0277490 A1 | 11/2011 | Meirav |
| 2012/0031525 A1 | 2/2012 | Wonders |
| 2012/0266889 A1 | 10/2012 | Roberts |
| 2013/0033377 A1 | 2/2013 | Hoseit |
| 2013/0086933 A1 | 4/2013 | Holtkamp et al. |
| 2013/0105010 A1 | 5/2013 | McLoughlin |
| 2014/0188286 A1 | 7/2014 | Hunka |
| 2014/0232876 A1 | 8/2014 | Dougherty |
| 2014/0338927 A1 | 11/2014 | Palle |
| 2015/0033765 A1 | 2/2015 | Blalock |
| 2015/0077737 A1 | 3/2015 | Belinsky et al. |
| 2015/0096768 A1 | 4/2015 | DuBrucq et al. |
| 2015/0130205 A1 | 5/2015 | Caskey |
| 2015/0131262 A1 | 5/2015 | Mabry |
| 2015/0170486 A1* | 6/2015 | Penland ............... G07C 9/30 |
| | | 348/152 |
| 2015/0204484 A1 | 7/2015 | Modirzareh et al. |
| 2015/0217518 A1 | 8/2015 | Chun et al. |
| 2015/0369498 A1 | 12/2015 | Motomura et al. |
| 2016/0003524 A1 | 1/2016 | Blalock |
| 2016/0114196 A1 | 4/2016 | Tribble |
| 2016/0116181 A1 | 4/2016 | Aultman et al. |
| 2016/0133108 A1 | 5/2016 | Bucsa et al. |
| 2016/0136017 A1 | 5/2016 | Caskey |
| 2016/0197772 A1 | 7/2016 | Britt et al. |
| 2016/0334061 A1 | 11/2016 | Toelle |
| 2016/0343187 A1 | 11/2016 | Trani |
| 2017/0006107 A1 | 1/2017 | Dawes et al. |
| 2017/0084156 A1 | 3/2017 | Myllymäki |
| 2017/0122580 A1 | 5/2017 | Karamanos et al. |
| 2017/0180829 A1 | 6/2017 | Schwarzkopf et al. |
| 2017/0236397 A1 | 8/2017 | Myslenski et al. |
| 2017/0303580 A1 | 10/2017 | Cameron et al. |
| 2017/0310498 A1 | 10/2017 | Brandman et al. |
| 2018/0181094 A1 | 6/2018 | Funk et al. |
| 2018/0197393 A1 | 7/2018 | Gallo et al. |
| 2018/0200552 A1 | 7/2018 | Wertsberger |
| 2018/0243591 A1 | 8/2018 | DeWitt |
| 2018/0283614 A1 | 10/2018 | Gandolfo |
| 2018/0375444 A1 | 12/2018 | Gamroth |
| 2019/0023529 A1 | 1/2019 | Lau |
| 2019/0103986 A1 | 4/2019 | Brandman et al. |
| 2019/0143161 A1 | 5/2019 | Burkhart et al. |
| 2019/0171780 A1 | 6/2019 | Santarone et al. |
| 2019/0174208 A1 | 6/2019 | Speicher et al. |
| 2019/0203885 A1 | 7/2019 | Sung |
| 2019/0282839 A1 | 9/2019 | Wenzel et al. |
| 2020/0012307 A1 | 1/2020 | Scelzi |
| 2020/0054905 A1 | 2/2020 | Livchak et al. |
| 2020/0107475 A1* | 4/2020 | Keisling ............... F25D 17/00 |
| 2020/0143300 A1 | 5/2020 | Weldemariam et al. |
| 2020/0225313 A1 | 7/2020 | Coles |
| 2020/0232309 A1 | 7/2020 | Deutch et al. |
| 2020/0294372 A1 | 9/2020 | Rodriguez |
| 2020/0334778 A1 | 10/2020 | Lotter |
| 2020/0349661 A1 | 11/2020 | Dutta et al. |
| 2021/0023323 A1 | 1/2021 | Wilkinson et al. |
| 2021/0038926 A1 | 2/2021 | Reedy |
| 2021/0113864 A1 | 4/2021 | Nam |
| 2021/0183218 A1* | 6/2021 | Johnson ............... G09G 3/002 |
| 2021/0237309 A1 | 8/2021 | Tessien |
| 2021/0241595 A1 | 8/2021 | Young et al. |
| 2021/0268322 A1 | 9/2021 | Thomas et al. |
| 2021/0280034 A1* | 9/2021 | Wedig ............... G08B 29/186 |
| 2021/0299495 A1 | 9/2021 | Feenstra et al. |
| 2021/0311008 A1 | 10/2021 | Hill |
| 2021/0358238 A1 | 11/2021 | Rogers et al. |
| 2021/0379429 A1 | 12/2021 | Darnell |
| 2022/0010996 A1 | 1/2022 | Carrieri |
| 2022/0099641 A1* | 3/2022 | Desrochers ........ G01N 33/0006 |
| 2022/0134147 A1 | 5/2022 | Webb et al. |
| 2022/0233900 A1 | 7/2022 | Williams |
| 2022/0260270 A1 | 8/2022 | Abate et al. |
| 2022/0404056 A1 | 12/2022 | Bloemer et al. |
| 2023/0034481 A1 | 2/2023 | Benton et al. |
| 2023/0070772 A1 | 3/2023 | Bingham et al. |
| 2023/0298346 A1 | 9/2023 | Alshammary |

FOREIGN PATENT DOCUMENTS

| | | |
|---|---|---|
| AU | 2021105506 A4 | 11/2021 |
| CA | 2760676 A1 | 11/2010 |
| CN | 101853549 A | 10/2010 |
| CN | 101968244 A | 2/2011 |
| CN | 201775882 U | 3/2011 |
| CN | 202052220 U | 11/2011 |
| CN | 202078672 U | 12/2011 |
| CN | 202615547 U | 12/2012 |
| CN | 102739786 B | 4/2013 |
| CN | 101298769 B1 | 8/2013 |
| CN | 203154649 U | 8/2013 |
| CN | 203160791 U | 8/2013 |
| CN | 203190560 U | 9/2013 |

(56) References Cited

FOREIGN PATENT DOCUMENTS

| | | |
|---|---|---|
| CN | 102364016 B | 2/2014 |
| CN | 102500021 B | 7/2014 |
| CN | 203799482 U | 8/2014 |
| CN | 102365458 B | 9/2014 |
| CN | 104056374 A | 9/2014 |
| CN | 104826248 A | 8/2015 |
| CN | 204534128 U | 8/2015 |
| CN | 104906717 A | 9/2015 |
| CN | 205031799 U | 2/2016 |
| CN | 104260763 B | 8/2016 |
| CN | 105917208 A | 8/2016 |
| CN | 106310553 A | 1/2017 |
| CN | 106899665 A | 6/2017 |
| CN | 105143778 B | 8/2017 |
| CN | 105247269 A | 9/2017 |
| CN | 206808757 U | 12/2017 |
| CN | 107991999 A | 5/2018 |
| CN | 105892538 B | 8/2018 |
| CN | 207750720 U | 8/2018 |
| CN | 106546008 A | 9/2018 |
| CN | 105091097 B | 1/2019 |
| CN | 105547285 A | 1/2019 |
| CN | 208536257 U | 2/2019 |
| CN | 109859368 A | 6/2019 |
| CN | 109939387 A | 6/2019 |
| CN | 110469950 A | 11/2019 |
| CN | 110478804 A | 11/2019 |
| CN | 110494811 A | 11/2019 |
| CN | 110673739 A | 1/2020 |
| CN | 209926530 U | 1/2020 |
| CN | 210135667 U | 3/2020 |
| CN | 111210588 A | 5/2020 |
| CN | 210739978 U | 6/2020 |
| CN | 111544817 A | 8/2020 |
| CN | 110047240 B | 10/2020 |
| CN | 109404582 B | 11/2020 |
| CN | 112344484 A | 2/2021 |
| CN | 212491267 U | 2/2021 |
| CN | 112657081 A | 4/2021 |
| CN | 108295407 B | 5/2021 |
| CN | 111258251 A | 5/2021 |
| CN | 113365029 A | 9/2021 |
| CN | 110493568 B | 10/2021 |
| CN | 111243219 A | 11/2021 |
| CN | 214550694 U | 11/2021 |
| CN | 113769292 A | 12/2021 |
| CN | 113842716 A | 12/2021 |
| CN | 114146332 A | 3/2022 |
| CN | 114205385 A | 3/2022 |
| CN | 114235301 A | 3/2022 |
| CN | 106678991 B | 5/2022 |
| CN | 114613092 A | 6/2022 |
| CN | 216855578 U | 7/2022 |
| CN | 217526213 U | 10/2022 |
| CN | 115645769 A | 1/2023 |
| EP | 2320397 B1 | 5/2012 |
| EP | 2 982 416 A1 | 2/2016 |
| EP | 2373384 B1 | 10/2018 |
| GB | 2248884 A | 4/1992 |
| JP | H06-343709 A | 12/1994 |
| JP | H08-124064 A | 5/1996 |
| JP | 3397382 B2 | 4/2003 |
| JP | 2004-298554 A | 10/2004 |
| JP | 2005291634 A | 10/2005 |
| JP | 5117700 B2 | 1/2013 |
| JP | 5654124 B2 | 1/2015 |
| JP | 5719010 B2 | 5/2015 |
| JP | 6189404 B2 | 8/2017 |
| JP | 6321134 B2 | 5/2018 |
| JP | 2021186616 A | 12/2021 |
| JP | 7109988 B2 | 8/2022 |
| KR | 20050097400 A | 10/2005 |
| KR | 100880023 B1 | 2/2009 |
| KR | 10-2010-0012689 A | 2/2010 |
| KR | 100945260 B1 | 3/2010 |
| KR | 10-2010-0115024 A | 10/2010 |
| KR | 20110078600 A | 7/2011 |
| KR | 20110002589 U | 11/2011 |
| KR | 101088547 B1 | 12/2011 |
| KR | 101089513 B1 | 12/2011 |
| KR | 101208662 B1 | 12/2012 |
| KR | 20130017610 A | 8/2013 |
| KR | 101722045 B1 | 3/2017 |
| KR | 101747360 B1 | 6/2017 |
| KR | 101762550 B1 | 7/2017 |
| KR | 101790694 B1 | 11/2017 |
| KR | 20170138810 A | 12/2017 |
| KR | 101815533 81 | 1/2018 |
| KR | 101841954 81 | 3/2018 |
| KR | 101845263 B1 | 4/2018 |
| KR | 101840682 B1 | 5/2018 |
| KR | 101845264 B1 | 5/2018 |
| KR | 101859878 B1 | 5/2018 |
| KR | 101859955 B1 | 5/2018 |
| KR | 101887164 81 | 9/2018 |
| KR | 101902976 B1 | 10/2018 |
| KR | 10-2019-0043669 A | 4/2019 |
| KR | 20180001140 U | 6/2019 |
| KR | 101996949 B1 | 7/2019 |
| KR | 102008625 B1 | 8/2019 |
| KR | 101994222 B1 | 9/2019 |
| KR | 102035835 B1 | 10/2019 |
| KR | 10-2019-0131158 A | 11/2019 |
| KR | 102050539 B1 | 12/2019 |
| KR | 10-2020-0027390 A | 3/2020 |
| KR | 102169547 B1 | 10/2020 |
| KR | 102263178 B1 | 6/2021 |
| KR | 102277919 B1 | 7/2021 |
| KR | 102300167 B1 | 9/2021 |
| KR | 102355909 B1 | 2/2022 |
| NL | 2019479 B1 | 8/2018 |
| RU | 74076 U | 6/2008 |
| RU | 2465933 C2 | 11/2012 |
| RU | 2717525 C1 | 3/2020 |
| RU | 2724093 C1 | 6/2020 |
| TW | 201425832 A | 9/2015 |
| TW | M540352 U | 4/2017 |
| WO | 2003031892 A1 | 4/2003 |
| WO | 2006047246 A2 | 5/2006 |
| WO | 2008021538 A2 | 2/2008 |
| WO | 2010063266 A1 | 6/2010 |
| WO | 2011034334 A2 | 3/2011 |
| WO | 2014208865 A1 | 12/2014 |
| WO | 2016205053 A1 | 12/2016 |
| WO | 2018038434 A1 | 3/2018 |
| WO | 2018176196 A1 | 10/2018 |
| WO | 2018236571 A1 | 12/2018 |
| WO | WO-2021/250389 A1 | 12/2021 |
| WO | 2022066099 A1 | 3/2022 |
| WO | 2023000087 A1 | 1/2023 |

OTHER PUBLICATIONS

"Indoor air quality in green buildings: A case-study in a residential high-rise building in the northeastern United States". Published at Journal of Environmental Science and Health, Published on [Feb. 2015] http://surl.li/fdzxk.

"Indoor Air-Quality Data-Monitoring System: Long-Term Monitoring Benefits", Published at MDIP, Published on [Sep. 25, 2019] https://www.mdpi.com/1424-8220/19/19/4157.

"A review of air filtration technologies for sustainable and healthy building ventilation", Published at Sustainable Cities and Society, Published on [Jul. 2017] https://core.ac.uk/download/pdf/84587706.pdf.

"A novel constant-air-volume range hood for high-rise residential buildings with 2 central shaft", Published at Energy and Buildings, Published on [May 2021] http://surl.li/feadf.

"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.

(56) References Cited

OTHER PUBLICATIONS

"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.
"Fire Safety", Published at Atomic Energy Regulatory Board India, Published on [May 2019] https://aerb.gov.in/images/PDF/fire.pdf.
"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.
"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.
"Review of research on air-conditioning systems and indoor air quality control for human health", Published at International Journal of Refrigeration, Published on [Jan. 2009] https://sci-hub.hkvisa.net/10.1016/j.ijrefrig.2008.05.004.
"A review of the performance of different ventilation and airflow distribution systems in buildings", Published at Building and Environment, Published on [Dec. 18, 2013] https://www.academia.edu/27228820/A_review_of_the_performance_of_different_ventilation_and_airflow_distribution_systems_in_buildings.
"Real-time sensors for indoor air monitoring and challenges ahead in deploying them to urban buildings", Published at Science of The Total Environment, Published on [Apr. 2016] https://eprints.ncl.ac.uk/file_store/production/223286/749E8E7D-D1EF-4056-BCDD-F48812167CB1.pdf.
"Indoor air quality and energy management through real-time sensing in commercial buildings", Published at Energy and Buildings, Published on [Jan. 2016] https://eprints.qut.edu.au/220977/1/93777.pdf.
"Compressors and Compressed Air Systems", Published at Continuing Education and Development, Found on [Mar. 2023] https://www.cedengineering.com/userfiles/Compressors%20and%20Compressed%20Air%20Systems%20R1.pdf.
"HVAC System", Published at Energy Conservation Building Code (ECBC) Tip Sheet, Published on [Jun. 2009] https://www.keralaenergy.gov.in/files/HVAC_System_Tip_Sheet.pdf.
"Air distribution of oxygen supply through guardrail slot diffusers in high-altitude hypoxic areas", Published at Building and Environment, Published on [Apr. 2020] https://rb.gy/9ktde6.
"Air Quality Control in Mine Refuge Chamber with Ventilation through Pressure Air Pipeline", Published at Process Safety and Environmental Protection, Published on [Dec. 2019]. https://uhra.herts.ac.uk/bitstream/handle/2299/23249/Manuscript.pdf;jsessionid=6F0E7E29FB3FF03D59759181BA6A6161?sequence=1.
International Search Report and Written Opinion for Appl. Ser. No. PCT/IB2024/050603 dated Apr. 24, 2024 (10 pages).
International Search Report and Written Opinion issued in connection with PCT/US2023/014763 dated Jun. 21, 2023 (8 pages).
International Search Report and Written Opinion issued in connection with PCT/US2023/014764 dated Jun. 23, 2023 (9 pages).
International Search Report and Written Opinion issued in connection with PCT/US2023/014765 dated Jun. 27, 2023 (10 pages).
International Search Report and Written Opinion issued in connection with PCT/US2023/017653 dated Jul. 24, 2023 (9 pages).
International Search Report and Written Opinion issued in connection with PCT/US2023/017656 dated Jul. 19, 2023 (10 pages).
International Search Report and Written Opinion issued in connection with PCT/US2023/017803 dated Jul. 24, 2023 (8 pages).
International Search Report and Written Opinion issued in connection with PCT/US2023/018401 dated Jul. 27, 2023 (10 pages).
International Search Report and Written Opinion issued in connection with PCT/US2023/019880 dated Aug. 2, 2023 (8 pages).
International Search Report and Written Opinion issued in connection with PCT/US2023/022222 dated Aug. 24, 2023 (11 pages).
International Search Report and Written Opinion issued in connection with PCT/US2023/022223 dated Sep. 4, 2023 (7 pages).
International Search Report and Written Opinion issued in connection with PCT/US2023/024766 dated Oct. 4, 2023 (7 pages).
International Search Report and Written Opinion issued in connection with PCT/US2023/025646 dated Oct. 11, 2023 (10 pages).
International Search Report and Written Opinion issued in connection with PCT/US2023/025647 dated Oct. 4, 2023 (10 pages).
International Search Report and Written Opinion issued in connection with PCT/US2023/026172 dated Oct. 31, 2023 (9 pages).
International Search Report and Written Opinion issued in connection with PCT/US2023/026174 dated Oct. 20, 2023 (7 pages).
International Search Report and Written Opinion issued in connection with PCT/US2023/026176 dated Oct. 17, 2023 (7 pages).
International Search Report and Written Opinion issued in connection with PCT/US2023/026425 dated Oct. 17, 2023 (12 pages).
International Search Report and Written Opinion issued in connection with PCT/US2023/026428 dated Oct. 17, 2023 (8 pages).
International Search Report and Written Opinion issued in connection with PCT/US2023/026466 dated Nov. 1, 2023 (8 pages).
"Rescue Air for Firefighters", Published at Fire Engineering, Published on [Sep. 8, 2014] https://rescueair.com/wp-content/uploads/2020/03/rescue-air-for-firefighters.whitepaperpdf.render.pdf.
"The Case for Interior High-Rise Breathing Air Systems", Published at Fire Engineering, Published on [Apr. 2012] https://rescueair.com/wp-content/uploads/2014/05/Rush-Article.pdf.
"RF Based Advance Smart Fire Safety System for Industries and Shopping Malls", Published at International Journal of Science and Research (IJSR), Published on [Dec. 2018] https://www.ijsr.net/archive/v7i12/ART20193898.pdf.
"Design and Implementation of Car Fire Detection and Automatic Car Door Opening Using IOT", Published at International Journal of Advances in Engineering and Management (IJAEM), Published on [ Jul. 7, 2022] https://ijaem.net/issue_dcp/Design%20and%20Implementaion%20of%20Car%20Fire%20Dectection%20and%20Automatic%20Car%20Door%20Opening%20Using%20Iot.pdf.
"Machine Vision Based Fire Detection Techniques: A Survey", Published al Springer Nature, Published on [Nov. 27, 2020] https://sci-hub.hkvisa.net/10.1007/s10694-020-01064-z.
"An Analysis of Firefighter Breathing Air Replenishment Systems", Published at Fire Protection Research Foundation, Published o[Apr. 2021] https://www.nfpa.org/-/media/Files/News-and-Research/Fire-statistics-and-reports/Emergency-responders/RFFAnalysisOfFFBARS.pdf.
"Fire Detection Systems in Wireless Sensor Networks", Published at World Conference on Technology, Innovation and Entrepreneurship, Published on [Jul. 3, 2015] https://www.sciencedirect.com/science/article/pil/S1877042815038872.
"Fire Safety System Building", Published al IOP Conference Series: Materials Science and Engineering, Published on [Nov. 2019] https://www.researchgate.net/publication/337402246_Fire_Safety_System_Building/fulltext/5dd573ae299bf11ec866bf2c/Fire-Safety-System-Building.pdf.
"SmartFire: Intelligent Platform for Monitoring Fire Extinguishers and Their Building Environment", Published at MDPI, Published on [May 25, 2019] https://www.mdpi.com/1424-8220/19/10/2390.
"A Smart Fire Detection System using IoT Technology With Automatic Water Sprinkler", Published at International Journal of Electrical and Computer Engineering (IJECE), Published on [Oct. 7, 2020] http://surl.li/esuhn.
"Situational Awareness for first responders:Evaluation of the BIMS field trial", Published at IEEE Xplore, Published on [Dec. 9, 2009] http://surl.li/esuid.
"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/links/5bb62f01299bf1049b6f57d7/Fire-Safety-in-Buildings.pdf.
"Ignis: Fire Detection and Mitigation System", Published at International Research Journal of Engineering and Technology (IRJET), Published on [Jun. 6, 2021 ] https://www.irjet.net/archives/V8/16/IRJET-V816493.pdf.

(56) References Cited

OTHER PUBLICATIONS

"An Intelligent Fire Detection and Mitigation System Safe from Fire (SFF)s", Published at International Journal of Computer Applications, Published on [Jan. 2016] https://www.ijcaonline.org/research/volume133/number6/mobin-2016-ijca-907858.pdf.

"Smart Fire Alert System Using IOT", Published at International Research Journal of Modernization in Engineering Technology and Science, Published on [Mar. 3, 2022 ] https://www.irjmets.com/uploadedfiles/paper/issue_3_march_2022/20213/final/fin_irjmets1648303966.pdf.

"Johnson Controls Acquires Rescue Air Systems To Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire-suppression-portfolio-co-5246-ga-co-1665048943-ga.1665049545.pdf.

"5.07 Air Replenishment Systems (2019)", Published at San Francisco Fire Department Bureau of Fire Prevention & Investigation, Found Online on [Feb. 8, 2014] https://sf-fire.org/media/1220/download?inline.

"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.

"Firefighter Air Replenishment Systems (FARS) Air Quality Fact Sheet", Published at Firefighter Air Coalition, Publish Online on [Feb. 8, 2014] https://aircoalition.org/wp-content/uploads/2021/03/FAC-FARS-Air-Quality-White-Paper.pdf.

"Technical Brief on System Controls for Industrial Compressed Air Systems", Published at Compressed Air And Gas Institute, Found Online on [Feb. 15, 2022] https://www.cagi.org/assets/documents/pdfs/SystemControlsTechnicalBrief.pdf?updated=1657712699.

"Case Study—System Controls", Published at Compressed Air And Gas Institute, Found Online on [Feb. 15, 2022] https://www.cagi.org/assets/documents/pdfs/SystemControlsCaseStudy.pdf?updated=1657712699.

"Technical Brief—Heat Recovery from Industrial Compressed Air Systems", Published at Compressed Air And Gas Institute, Found Online on [Feb. 15, 2022] https://www.cagi.org/assets/documents/pdfs/HeatRecoveryTechnicalBrief.pdf?updated=1657712699.

"Technical Brief on Distribution Piping Network", Published at Compressed Air And Gas Institute, Found Online on [Feb. 15, 2022] https://www.cagi.org/assets/documents/pdfs/DistributionPipingNetworkTechnicalBrief.pdf?updated=1657712699.

"Technical Brief on Pressure Drop", Published at Compressed Air And Gas Institute, Found Online on [Feb. 15, 2022] https://www.cagi.org/assets/documents/pdfs/PressureDropTechnicalBrief.pdf?updated=1657712700.

"Technical Brief on Variable Speed Drive", Published at Compressed Air And Gas Institute, Found Online on [Feb. 15, 2022] https://www.cagi.org/assets/documents/pdfs/VariableSpeedDriveTechnicalBrief.pdf?updated=1657712699.

"Compressor Room Advantages with Oil-Free Centrifugal Air Compressors", Published at Compressed Air And Gas Institute, Found Online on [Feb. 15, 2022] https://www.cagi.org/pdf/downloads/compressor-room-advantages-with-oil-free-centrifugal-air-compressors.

"Preparing Reciprocating Air Compressors for Winter", Published at Compressed Air And Gas Institute, Found Online on [Feb. 15, 2022] https://www.cagi.org/pdf/downloads/preparing-reciprocating-air-compressors-for-winter.

"Nitrogen Characteristics and Benefits of On-Site Generation", Published at Compressed Air And Gas Institute, Found Online on [Feb. 15, 2022] https://www.cagi.org/pdf/downloads/19-nitrogen-characteristics-and-benefits-of-on-site-generation.

"Key Considerations for installing Centrifugal Air Compressors", Published at Compressed Air And Gas Institute, Found Online on [Feb. 15, 2022] https://www.cagi.org/pdf/downloads/20-key-considerations-for-installing-centrifugal-air-compressors.

"Compressed Air & Gas Handbook", Published at Compressed Air And Gas Institute, Found Online on [Feb. 15, 2022] https://www.cagi.org/handbook-pdfs/handbook-chapter-1.

"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.

"Fire Hazard in Buildings: Review,Assessment and Strategies For Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review-assessment-and-strategies-for-improving-fire-safety.

"Environmental Study Of Firefighters", Published at University of California, Publish on [Sep. 8, 2015] https://sci-hub.hkvisa.net/10.1093/annhyg/35.6.581.

"Summary of human responses to ventilation", Published at California Digital Library University of Clifiornia, Publish on [Jun. 1, 2004] https://escholarship.org/content/qt64k2p4dc/qt64k2p4dc.pdf.

"Fixed Fire Protection Systems in Tunnels:Issues and Directions", Published at Fire Technology, Publish on [Sep. 30, 2010] https://sci-hub.hkvisa.net/10.1007/s10694-011-0220-2.

"Comparison of Underfloor Vs. Overhead Air Distribution Systems in an Office Building", Published at Department of Architecture, Waseda University, Found Online on [Feb. 15, 2022] https://www.airfixture.com/wp-content/uploads/2016/07/ASHRAE-Underfloor-vs-Overhead-Study.pdf.

"General Requirements in piping Design", Published at RMIT University in partnership with Informit Open, Publish on [Jul. 2021] https://search.informit.org/doi/epdf/10.3316/informit.947188479100130.

"Optimal operation of heat supply systems with piping network", Published at Department of Mechanical Engineering, Osaka Prefecture University, Publish on [ Oct. 14, 2016] https://sci-hub.hkvisa.net/10.1016/j.energy.2017.03.146.

"Compressed Air Piping Network Inspection And Documentation For PAROC", Published at Turku University of Applied Sciences, Found Online on (Feb. 15, 2022]. https://www.theseus.fi/bitstream/handle/10024/122415/Myllyniemi_Jani.pdf?sequence=1.

"Natural Gas Pipeline Technology Overview", Publish at Argonne National Laboratory, Publish on [ Nov. 2007] https://publications.anl.gov/anlpubs/2008/02/61034.pdf.

"Improving the indoor air quality using the individual air supply system", Publish at Int. J. Environ. Sci. Technol., Publish on [ Jul. 24, 2017]. https://link.springer.com/content/pdf/10.1007/s13762-017-1432-x.pdf?pdf=button.

"Analytical Modeling of Fire Smoke Spread in High-rise Buildings",Canada Publish on [ Sep. 2016]. https://core.ac.uk/download/pdf/211519293.pdf.

"Chapter 6 Fire-Fighting Systems" https://www.globalsecurity.org/military/library/policy/navy/nrtc/14057_ppr_ch6.pdf.

"Research and Perspectives on Fire-Fighting Systems in Tunnels under Strong Piston Wind Action", By Xiaoyi Zhao et al., Published at Construction Management, and Computers & Digitization, Published on [Jan. 31, 2023] https://www.mdpi.com/2075-5309/13/2/435.

"Wireless sensor network applications in monitoring and control of gas networks", By Sajad Balall Dehkordi et al., Published at Majlesi Journal of Telecommunication Devices , Published on [Jun. 23, 2012] https://mjtd.isfahan.iau.ir/article_695667_a4c0e30293098b0ac5497f27c43f5bb9.pdf.

"Sustainability of Air Supply in Areas Immediately Dangerous to Life and Health", By Christopher W. Norris, Published at Northampton Fire Department,MA , Published in [Feb. 2008] https://apps.usfa.fema.gov/pdf/efop/efo41710.pdf.

"Sensor-based safety management", By Amin Asadzadeh et al., Published at Automation in Construction , Published on [Feb. 7, 2020] https://sci-hub.hkvisa.net/10.1016/j.autcon.2020.103128.

"Remote Monitoring and Control Using Mobile Phones", By Dr. Mikael Sjodin, Published at Newline Information , Published in [Nov. 2001] http://www.es.mdh.se/pdf_publications/413.pdf.

"Monitored Performance of an Office Buildingwith an Under-Floor Air Distribution System ", By Christine E. Walker et al., Published at Fifth International Conference for Enhanced Building Opera-

(56) References Cited

OTHER PUBLICATIONS tions, Pittsburgh, Pennsylvania, Published on [Oct. 13, 2005] https://oaktrust.library.tamu.edu/bitstream/handle/1969.1/5105/ESL-IC-05-10-13.pdf?sequence=4.

"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.

"Firefighter Fatalities in the US in 2021", By Rita F. Fahy et al., Published at National Fire Protection Association (NFPA), Published in [Aug. 2022] https://www.nfpa.org/-/media/Files/News-and-Research/Fire-statistics-and-reports/Emergency-responders/osFFF.pdf.

"Reversible Longitudinal Smoke Extraction System in Enclosed Underground Parking Structure", By KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.

"Mapping Fire and Firefighter Visibility for Improving Situational Awareness", By Katherine Ann Mistick, Published at The University of Utah ProQuest Dissertations, Published in [May 2022] https://www.proquest.com/openview/089c0ac0998979da3b550b77ddee2bf1/1?pq-origsile=gscholar&cbl=18750&diss=y.

"An ultra-wide band indoor personnel tracking system for emergency situations (Europcom)", By Anthony Putorti Jr et al., Published at Radar Conference, 2008. EuRAD 2008. European, Published in [Dec. 2008] http://surl.li/hqxep.

"Threat modeling in smart firefighting systems: Aligning MITRE Att&ck matrix and NIST security controls", Shahzaib Zahid et al., Published at Internet of Things, Published on [Mar. 21, 2023] https://tinyurl.com/msjusd3y.

"Autonomous Fire Suppression System for Use in High and Low Visibility Environments by Visual Servoing", By Joshua G. McNeil et al., Published at Fire Technology 2016, Published on [Jan. 7, 2016] https://sci-hub.hkvisa.net/10.1007/s10694-016-0564-8.

"Breathing Limited Air Situational Training Masks (BlastMask) Versus SelfContained Breathing Apparatus (SCBA) for Firefighters: A Pilot Study", By Thomas L. Andre et al., Published at International journal of exercise science, Published in [2019]. https://digitalcommons.wku.edu/cgi/viewcontent.cgi?article=2498&context=ijes.

"Internet of Things technology for fire monitoring system", By S.R.Vijayalakshmi et al., Published at International Research Journal of Engineering and Technology (IRJET), Published on [Jun. 6, 2017] https://www.irjet.net/archives/V4/16/IRJET-V4I6418.pdf.

"Firefighter Safety Using IoT", By Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.

"A smart fire detection system using IoT technology with automatic water sprinkler", By Hamood Alqourabah et al., Published at International Journal of Electrical and Computer Engineering (IJECE), Published on [Mar. 5, 2021] https://pdfs.semanticscholar.org/f3e7/a7c0cf2d448be592421045033506e845e6c2.pdf.

"Route Planning for Fire Rescue Operations in Long-Term Care Facilities Using Ontology and Building Information Models", By Caroline Jebakumari S et al., Published at Building Information Modelling, Semantic Web and Internet-of-Things for Smart Cities, Published on [Jul. 21, 2022]. https://www.mdpi.com/2075-5309/12/7/1060?type=check_update&version=2.

\* cited by examiner

METHODS AND SYSTEM OF INCIDENT BASED CAMERA DEVICE ACTIVATION IN A FIREFIGHTER AIR REPLENISHMENT SYSTEM HAVING BREATHABLE AIR SUPPLIED THEREIN

CLAIM OF PRIORITY

This application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022, U.S. Provisional Patent Application No. 63/413,616 titled VIDEO CAMERA AT EMERGENCY AIR FILL PANEL FOR INCIDENT COMMAND VISUAL AND TRANSCRIPTION OF AUDIO VIA MOBILE DEVICE filed on Oct. 6, 2022, U.S. Provisional Patent Application No. 63/357,743 titled CONTINUAL AIR QUALITY MONITORING THROUGH LOCALIZED ANALYSIS OF BREATHABLE AIR THROUGH A SENSOR ARRAY filed on Jul. 1, 2022, U.S. Provisional Patent Application No. 63/357,754 titled ON-DEMAND CERTIFICATION THROUGH COMMUNICATION OF ASSOCIATED AIR-QUALITY MARKER DATA TO A REMOTE CERTIFICATION LABORATORY filed on Jul. 1, 2022, and U.S. Provisional Patent Application No. 63/359,882 titled REMOTE MONITORING AND CONTROL OF A FIREFIGHTER AIR REPLENISHMENT SYSTEM THROUGH SENSORS DISTRIBUTED WITHIN COMPONENTS OF THE FIREFIGHTER AIR REPLENISHMENT SYSTEM filed on Jul. 11, 2022. The contents of each of the aforementioned applications are incorporated herein by reference in entirety thereof.

FIELD OF TECHNOLOGY

This disclosure relates generally to emergency systems and, more particularly, to methods and/or a system of incident based camera device activation in a safety system of a structure having breathable air supplied therein.

BACKGROUND

A structure (e.g., a vertical building, a horizontal building, a tunnel, marine craft) may have a Firefighter Air Replenishment System (FARS) implemented therein. The FARS may have an emergency air fill station therein to enable firefighters and/or emergency personnel access breathable air therethrough. The FARS may have other components relevant to critical functioning thereof. An incident (e.g., a fire, smoke/air pollution) occurring in the structure in a vicinity of one or more components of the FARS may endanger lives of the emergency personnel and/or people within the structure. Reducing chances of occurrence of the incident may warrant repeated monitoring of the FARS. Despite the careful monitoring, the incident may recur. Even if occurrence of the incident is controlled through painstaking design of the FARS based on the careful monitoring, another emergency situation resulting in casualties and/or damage to the structure may occur.

SUMMARY

Disclosed are methods and/or a system of incident based camera device activation in a safety system of a structure having breathable air supplied therein.

In one aspect, a method of a safety system of a structure having a fixed piping system implemented therein to supply breathable air thereacross is disclosed. The method includes integrating one or more sensor(s) associated with one or more component(s) of the safety system with a computing platform executing on a data processing device. The one or more component(s) relates to access of the breathable air within the safety system. The method also includes, in accordance with the integration of the one or more sensor(s) with the computing platform, sensing one or more environmental parameter(s) of the one or more component(s) of the safety system, and automatically activating one or more camera device(s) in a vicinity of and/or on the one or more component(s) of the safety system based on determining, from the sensing of the one or more environmental parameter(s), occurrence of an incident.

In another aspect, a safety system of a structure having a fixed piping system implemented therein to supply breathable air thereacross is disclosed. The safety system includes one or more component(s) related to access of the breathable air within the safety system. one or more sensor(s) associated with the one or more component(s), and a data processing device executing a computing platform thereon to integrate the one or more sensor(s) with the computing platform. In accordance with the integration of the one or more sensor(s) with the computing platform, the one or more sensor(s) senses one or more environmental parameter(s) of the one or more component(s), and a processor associated with the one or more sensor(s) automatically activates one or more camera device(s) in a vicinity of and/or on the one or more component(s) based on determining, from the sensing of the one or more environmental parameter(s), occurrence of an incident.

In yet another aspect, a method of a safety system of a structure having a fixed piping system implemented therein to supply breathable air thereacross is disclosed. The method includes integrating one or more sensor(s) associated with one or more component(s) of the safety system with a computing platform executing on a data processing device. The one or more component(s) relates to access of the breathable air within the safety system. The method also includes, in accordance with the integration of the one or more sensor(s) with the computing platform, sensing one or more environmental parameter(s) of the one or more component(s) of the safety system, and automatically activating one or more camera device(s) in a vicinity of and/or on the one or more component(s) of the safety system based on determining, from the sensing of the one or more environmental parameter(s), occurrence of an incident. Further, the method includes, in accordance with the automatic activation of the one or more camera device(s), capturing visual data and/or audio data of the incident.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide methods and/or a system of incident based camera device activation in a safety system of a structure having breathable air supplied therein. Although the present embodiments have been described with reference to specific example embodiments, it will be evident that various modifications and changes may be made to these embodiments without departing from the broader spirit and scope of the various embodiments.

Figure 1:
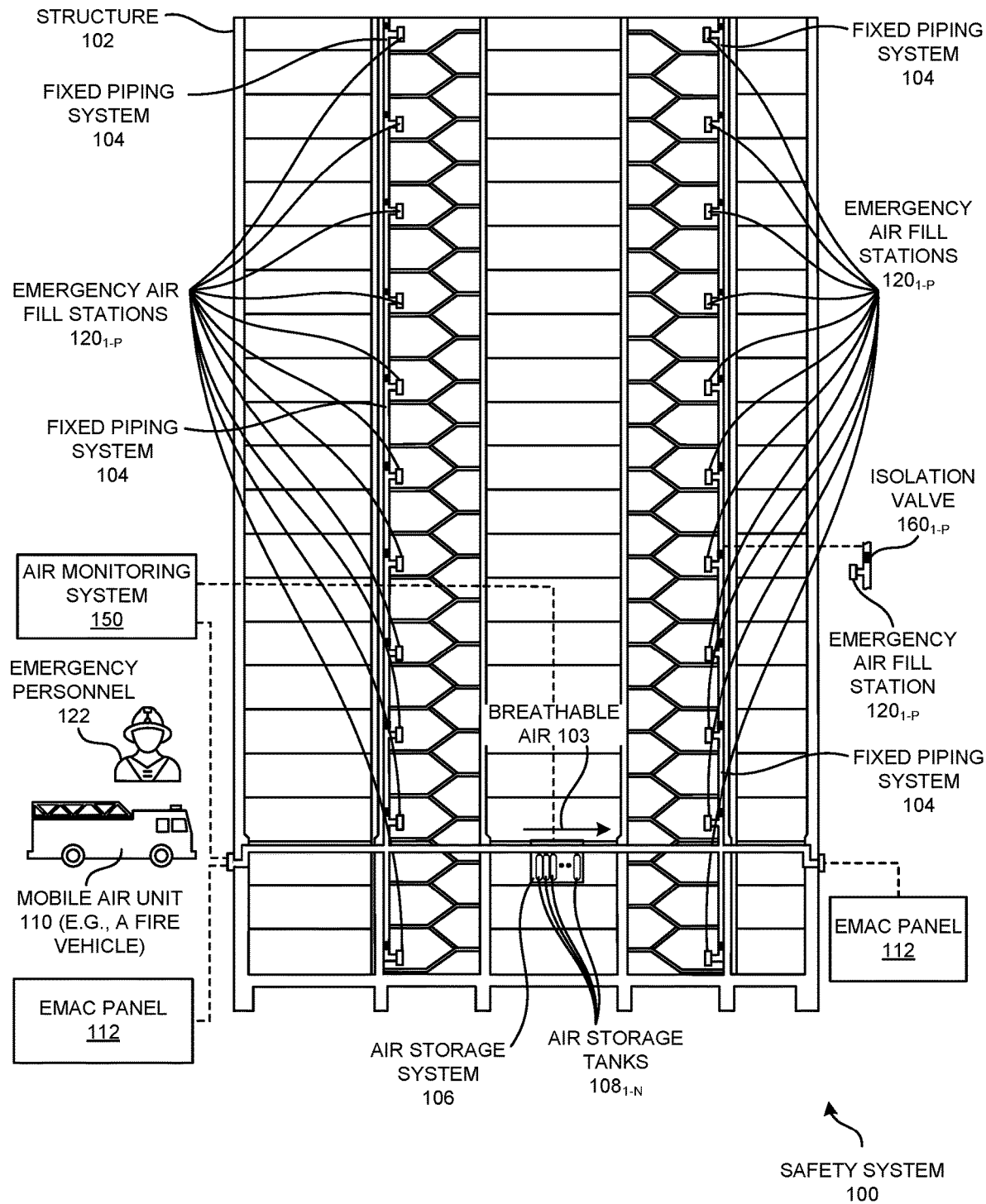
FIG. 1 is a schematic and an illustrative view of a safety system associated with a structure, according to one or more embodiments.

FIG. 1 shows a safety system 100 associated with a structure 102, according to one or more embodiments. In one or more embodiments, safety system 100 may be a Firefighter Air Replenishment System (FARS) to enable firefighters entering structure 102 in times of fire-related emergencies to gain access to breathable (e.g., human breathable) air (e.g., breathable air 103) in-house without the need of bringing in air bottles/cylinders to be transported up several flights of stairs of structure 102 or deep thereinto, or to refill depleted air bottles/cylinders that are brought into structure 102. In one or more embodiments, safety system 100 may supply breathable air provided from a supply of air tanks (to be discussed) stored in structure 102. When a fire department vehicle arrives at structure 102 during an emergency, breathable air supply typically may be provided through a source of air connected to said vehicle. In one or more embodiments, safety system 100 may enable firefighters to refill air bottles/cylinders thereof at emergency air fill stations (to be discussed) located throughout structure 102. Specifically, in some embodiments, firefighters may be able to fill air bottles/cylinders thereof at emergency air fill stations within structure 102 under full respiration in less than one to two minutes.

In one or more embodiments, structure 102 may encompass vertical building structures, horizontal building structures (e.g., shopping malls, hypermarts, extended shopping, storage and/or warehousing related structures), tunnels, marine craft (e.g., large marine vessels such as cruise ships, cargo ships, submarines and large naval craft, which may be "floating" versions of buildings and horizontal structures) and mines. Other structures are within the scope of the exemplary embodiments discussed herein. In one or more embodiments, safety system 100 may include a fixed piping system 104 permanently installed within structure 102 serving as a constant source of replenishment of breathable air 103. Fixed piping system 104 may be regarded as being analogous to a water piping system within structure 102 or another structure analogous thereto for the sake of imaginative convenience.

As shown in FIG. 1, fixed piping system 104 may distribute breathable air 103 across floors/levels of structure 102. For the aforementioned purpose, fixed piping system 104 may distribute breathable air 103 from an air storage system 106 (e.g., within structure 102) including a number of air storage tanks $108_{1}$-N that serve as sources of pressurized/compressed air (e.g., breathable air 103). Additionally, in one or more embodiments, fixed piping system 104 may interconnect with a mobile air unit 110 (e.g., a fire vehicle) through an External Mobile Air Connection (EMAC) panel 112.

In one or more embodiments, EMAC panel 112 may be a boxed structure (e.g., exterior to structure 102) to enable the interconnection between mobile air unit 110 and safety system 100. For example, mobile air unit 110 may include an on-board air compressor to store and replenish pressurized/compressed air (e.g., breathable air analogous to breathable air 103) in air bottles/cylinders (e.g., utilizable with Self-Contained Breathing Apparatuses (SCBAs) carried by firefighters). Mobile air unit 110 may also include other pieces of air supply/distribution equipment (e.g., piping and/or air cylinders/bottles) that may be able to leverage the sources of breathable air 103 within safety system 100 through EMAC panel 112. Firefighters, for example, may be able to fill breathable air (e.g., breathable air 103, breathable air analogous to breathable air 103) into air bottles/cylinders (e.g., spare bottles, bottles requiring replenishment of breathable air) carried on mobile air unit 110 through safety system 100.

In FIG. 1, EMAC panel 112 is shown at two locations merely for the sake of illustrative convenience. In one or more embodiments, an air monitoring system 150 may be installed as part of safety system 100 to automatically track and monitor a parameter (e.g., pressure) and/or a quality (e.g., indicated by moisture levels, carbon monoxide levels) of breathable air 103 within safety system 100. FIG. 1 shows air monitoring system 150 as communicatively coupled to air storage system 106 and EMAC panel 112 merely for the sake of example. It should be noted that EMAC panel 112 may be at a remote location associated with (e.g., internal to, external to) structure 102. In one or more embodiments, for monitoring the parameters and/or the quality of breathable air within safety system 100, air monitoring system 150 include appropriate sensors and circuitries therein. For example, a pressure sensor (to be discussed) within air monitoring system 150 may automatically sense and record a pressure of breathable air 103 of safety system 100. Said pressure sensor may communicate with an alarm system that is triggered when the sensed pressure is outside a safety range. Also, in one or more embodiments, air monitoring system 150 may automatically trigger a shutdown of breathable air distribution through safety system 100 in case of impurity/contaminant (e.g., carbon monoxide) detection therethrough yielding levels above a safety/predetermined threshold.

In one or more embodiments, fixed piping system 104 may include pipes (e.g., constituted out of stainless steel tubing) that distribute breathable air 103 to a number of emergency air fill stations $120_{1-P}$ within structure 102. In one example implementation, each emergency air fill station $120_{1-P}$ may be located at a specific level of structure 102. If structure 102 is regarded as a vertical building structure, an emergency air fill station $120_{1-P}$ may be located at each of a basement level, a first floor level, a second floor level and so on. For example, emergency air fill station $120_{1-P}$ may be located at the end of the flight of stairs that emergency fighting personnel (e.g., firefighting personnel) need to climb to reach a specific floor level within the vertical building structure.

In one or more embodiments, an emergency air fill station $120_{1-P}$ may be a static location within a level of structure 102 that provides emergency personnel 122 (e.g., firefighters, emergency responders) with the ability to rapidly fill air bottles/cylinders (e.g., SCBA cylinders) with breathable air 103. In one or more embodiments, emergency air fill station $120_{1-P}$ may be an emergency air fill panel or a rupture containment air fill station. In one or more embodiments, proximate each emergency air fill station $120_{1-P}$, safety system 100 may include an isolation valve $160_{1-P}$ to isolate a corresponding emergency air fill station $120_{1-P}$ from a rest of safety system 100. For example, said isolation may be achieved through the manual turning of isolation valve $160_{1-P}$ proximate the corresponding emergency air fill station $120_{1-P}$ or remotely (e.g., based on automatic turning) from air monitoring system 150. In one example implementation, air monitoring system 150 may maintain breathable air supply to a subset of emergency air fill stations $120_{1-P}$ via fixed piping system 104 through control of a corresponding subset of isolation valves $160_{1-P}$ and may isolate the other emergency air fill stations $120_{1-P}$ from the breathable air supply. It should be noted that configurations and components of safety system 100 may vary from the example safety system 100 of FIG. 1.

Figure 2:
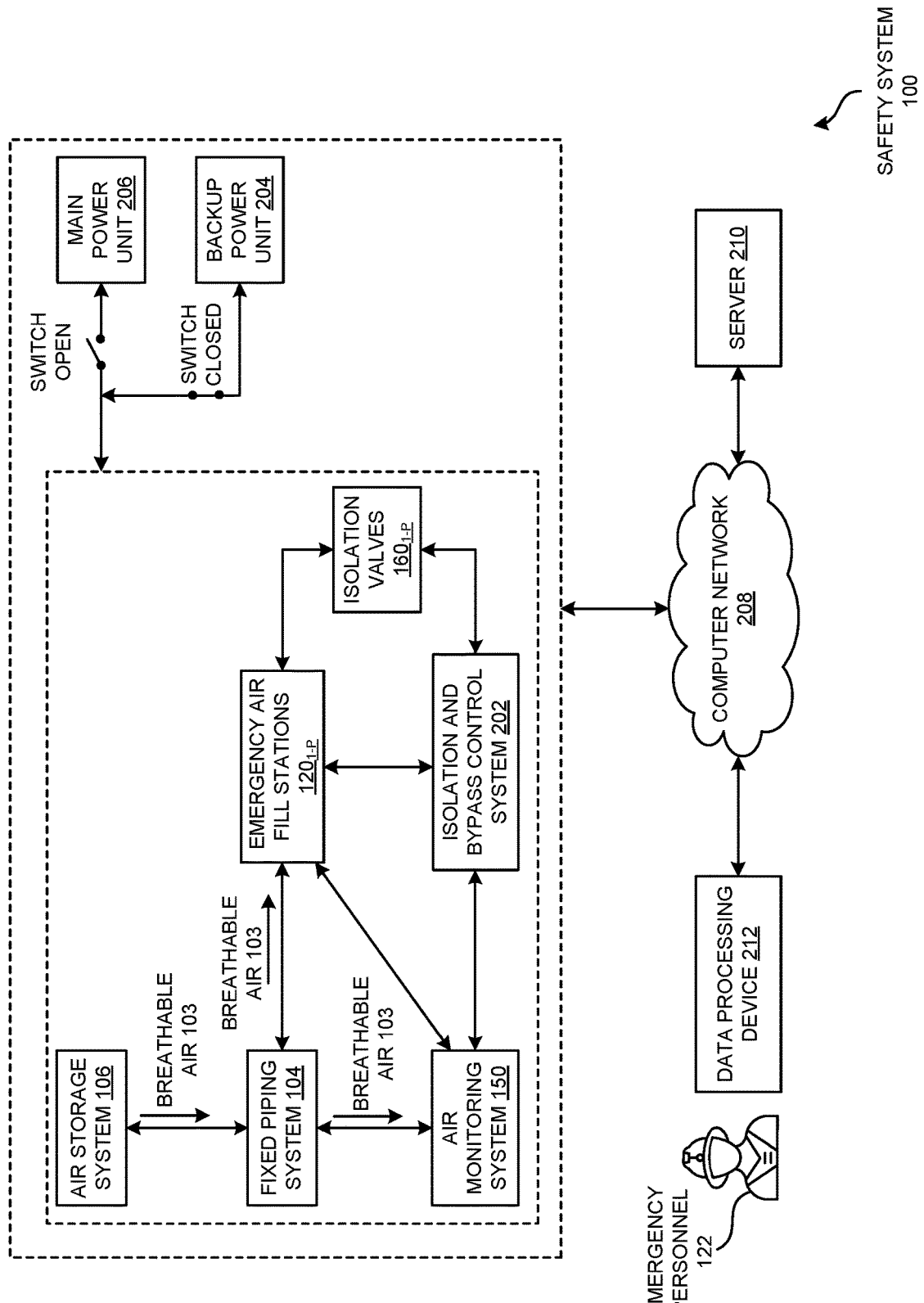
FIG. 2 is a schematic view of the safety system of FIG. 1 with elements thereof integrated therewithin in detail, according to one or more embodiments.

FIG. 2 shows safety system 100 with elements thereof integrated therewithin in detail, according to one or more embodiments. In one or more embodiments, safety system 100 may include air monitoring system 150 discussed above communicatively coupled to fixed piping system 104, to which emergency air fill stations $120_{1-P}$ are also coupled. In one or more embodiments, as seen above, the source of breathable air 103 may be air storage system 106. In one or more embodiments, safety system 100 may also include an isolation and bypass control system 202 that is constituted by a set of electrical, mechanical and/or electronic components working together to automatically include and/or bypass one or more emergency air fill station(s) $120_{1-P}$. For the aforementioned purpose, in one or more embodiments, isolation valve(s) $160_{1-P}$ associated with the aforementioned emergency air fill stations $120_{1-P}$ may be controlled (e.g., by opening or closing one or more of said isolation valves $160_{1-P}$) by isolation and bypass control system 202.

Further, in one or more embodiments, safety system 100 may include a backup power unit 204 (e.g., an electrical power system with electronic integration) to ensure uninterrupted power to components of safety system 100 during emergencies (e.g., a power cut, a mains power issue, a fire accident effected power issue). For the aforementioned purpose, in one or more embodiments, backup power unit 204 may be switched on in the case of a power related emergency with respect to a main power unit 206 (e.g., Alternating Current (AC) mains power, Direct Current (DC) power) associated with safety system 100.

In one or more embodiments, one or more or all of the abovementioned components of safety system 100 may be integrated with sensor(s) to detect environmental conditions thereof. In one or more embodiments, based on the detection of the environmental conditions thereof, camera devices (e.g., video and/or audio; to be discussed below) may be automatically turned on to capture visuals and/or audio data of environments associated with the one or more components of safety system 100. In one or more embodiments, the one or more components may be communicatively coupled through a computer network 208 (e.g., a Local Area Network (LAN), a Wide Area Network (WAN), a cloud computing network, a short-range communication network based on Bluetooth®, WiFi® and the like) to a remote server 210 (e.g., a network of servers, a single server, a distributed network of servers, a command room server associated with safety system 100 and so on). As will be discussed below, in one or more embodiments, server 210 may obtain data from the sensor(s), camera devices and other data from safety system 100, perform analyses (e.g., predictive, non-predictive) thereof and provide recommendations (e.g., situational awareness based) based on the analyses.

In addition, in one or more embodiments, safety system 100 may include a data processing device 212 (e.g., a mobile phone, a tablet, an iPad®, a laptop, a desktop) also communicatively coupled to one or more components or each component of safety system 100 and server 210 through computer network 208. Thus, in one or more embodiments, one or more components or each component of safety system 100 may have interfaces (not explicitly shown) for wireless communication through computer network 208. Also, as will be discussed below, in one or more embodiments, wherever possible, elements (e.g., handheld Thermal Imaging Cameras (TICs), portable TICs, aerial TICs, camera devices, audio devices, light devices, one or more or all sensors discussed herein) may be Internet of Things (IoT) devices capable of collecting and feeding data to server 210 through computer network 208. In one or more embodiments, IoT devices (or IoT enabled devices) may be devices and/or components with programmable hardware that can transmit data over computer networks (e.g., computer network 208 such as the Internet and/or other networks); said IoT devices may include or be associated with edge devices (not shown) to control data flow at the boundaries to computer network 208.

Figure 3:
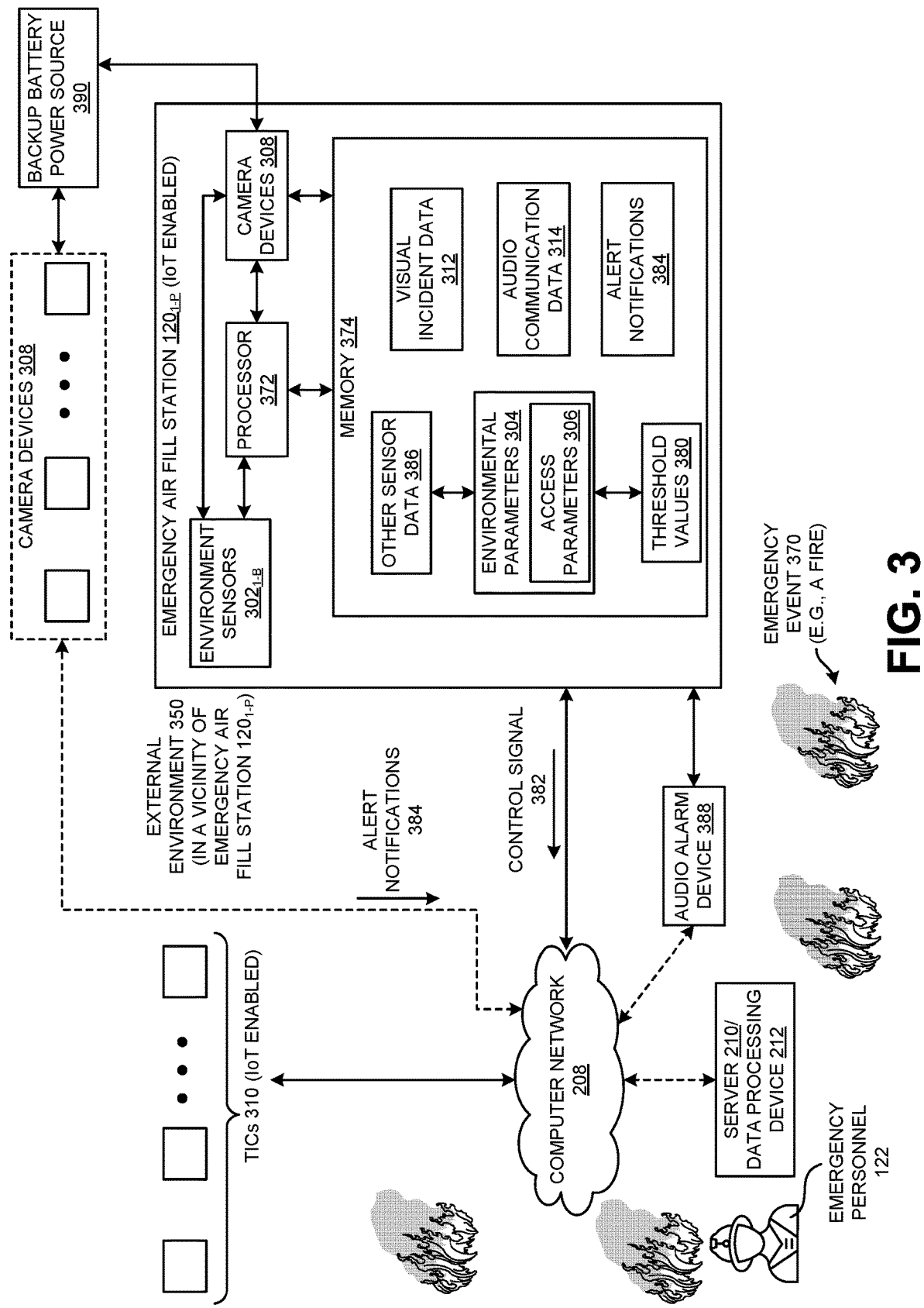
FIG. 3 is a schematic view of an emergency air fill station of the safety system of FIGS. 1-2 and an illustrative view of a context of an emergency event in an external environment thereof, according to one or more embodiments.

FIG. 3 shows an emergency air fill station $120_{1-P}$, according to one or more embodiments. Again, in one or more embodiments, emergency air fill station $120_{1-P}$ may include one or more environment sensors $302_{1-B}$ integrated therewith configured to sense environmental parameters 304 (e.g., temperature, audio alarm detection (e.g., a person screaming "fire!"), pressure, smoke, motion, ambient light) associated with an environment (e.g., external environment 350) in an immediate vicinity of emergency air fill station $120_{1-P}$. In one or more embodiments, environment sensors $302_{1-B}$ may also sense access (e.g., access parameters 306 that are part of environmental parameters 304 in FIG. 3) of and attempts to access emergency air fill station $120_{1-P}$ by emergency personnel 122 (e.g., maintenance personnel, firefighters, emergency responders) and/or unauthorized personnel (e.g., example access by unauthorized personnel may involve tampering of one or more element(s) of emergency air fill station $120_{1-P}$). In one or more embodiments, emergency air fill station $120_{1-P}$ may have one or more camera devices 308 integrated therewith or external (e.g., in external environment 350) thereto. In some embodiments, camera devices 308 may be considered as encompassing one or more environment sensors $302_{1-B}$ (e.g., motion detection sensors); FIG. 3 shows camera devices 308 as distinct from environment sensors $302_{1-B}$ merely for example purposes.

In one or more embodiments, emergency air fill station $120_{1-P}$ may include a processor 372 (e.g., a microcontroller, a processor core, a single processor) communicatively coupled to a memory 374 (e.g., a volatile and/or a non-volatile memory). In one or more embodiments, environment sensors $302_{1-B}$ may be interfaced with processor 372 and all of the abovementioned data/parameters (e.g., environmental parameters 304) may be stored in memory 374, as shown in FIG. 3. FIG. 3 also shows TICs 310 as part of safety system 100 and in external environment 350 of emergency air fill station $120_{1-P}$, according to one or more embodiments. In one or more embodiments, TICs 310 may be infrared cameras that sense infrared energy of objects to render images/video frames thereof corresponding to surface temperatures of said objects. In one or more embodiments, emergency personnel 122 may employ said TICs 310 to detect obstacles on the paths to/around emergency air fill stations $120_{1-P}$ under low visibility; this may enable emergency personnel 122 perform rescue operations efficiently. As discussed and implied above, TICs 310 may be integrated with IoT capabilities to transmit data to server 210 through computer network 208. Said data may be part of access parameters 306 or separate data transmitted to server 210.

It should be noted that the sensing, detection and/or transmission of data to server 210 discussed above with regard to emergency air fill station $120_{1-P}$ may also be performed at a device external to emergency air fill station $120_{1-P}$. In such implementations, the external device itself may obviously be a component of safety system 100 with IoT/wireless communication capabilities. While FIG. 3 has been discussed with regard to an emergency air fill station $120_{1-P}$, concepts discussed herein may be applicable across other components of safety system 100 such as air monitoring system 150, air storage system 106, isolation and bypass control system 202 and even backup power unit 204.

Figure 4:
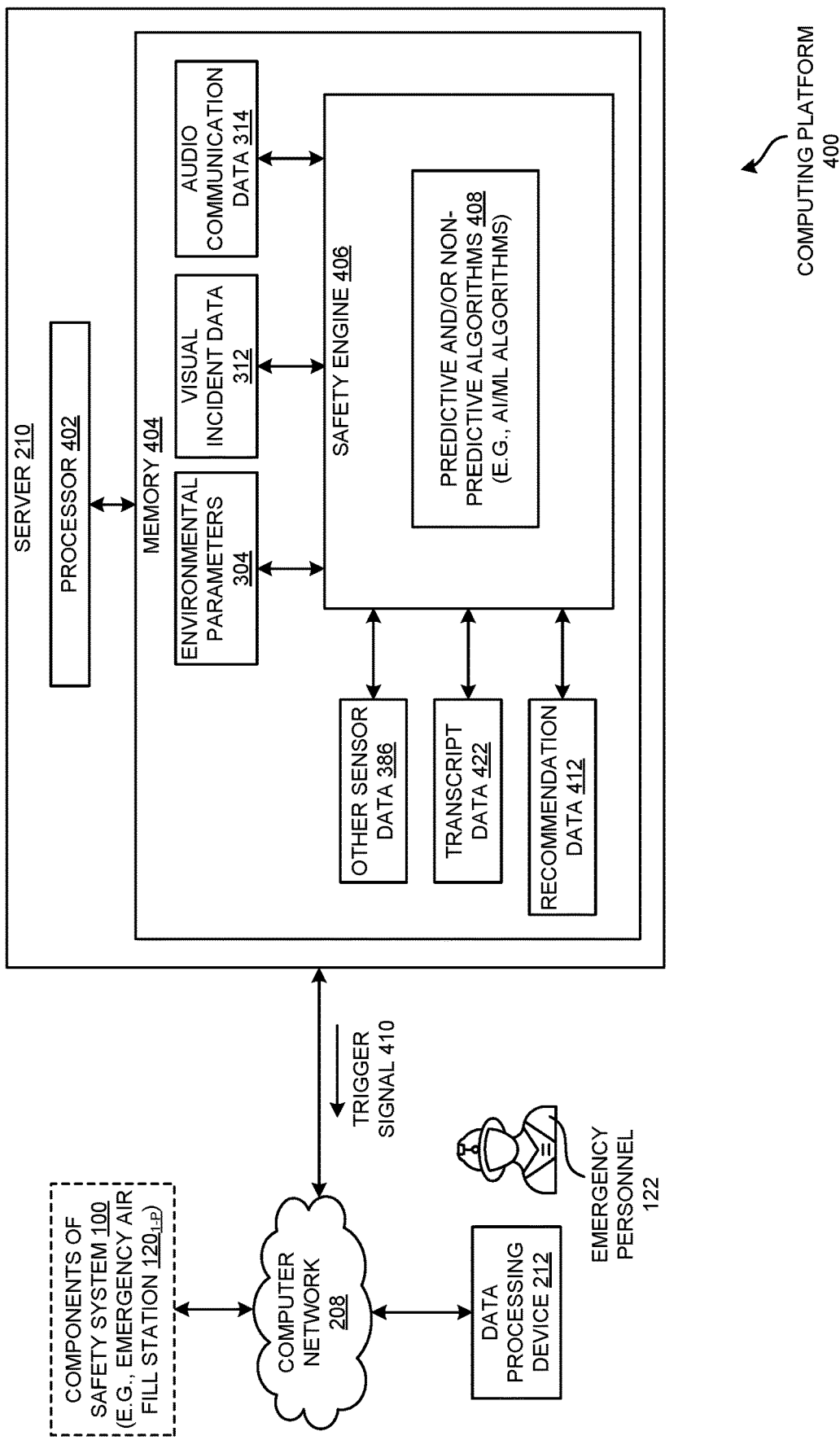
FIG. 4 is a schematic view of a computing platform relevant to the safety system of FIGS. 1-2 implemented through a server, according to one or more embodiments.

FIG. 4 shows a computing platform 400 relevant to the FARS of safety system 100 implemented through server 210, according to one or more embodiments. In one or more embodiments, server 210 may be a distributed (e.g., across a cloud) network of servers, a cluster of servers or a standalone server. As discussed above, in some embodiments, server 210 may be implemented as part of a fire command room within safety system 100; additionally or alternatively, server 210 may be implemented external to safety system 100. As shown in FIG. 4, server 210 may include a processor 402 (e.g., a processor core, a network of processors, a single processor), communicatively coupled to a memory 404 (e.g., a volatile and/or a non-volatile memory). In one or more embodiments, memory 404 may include a safety engine 406 associated with the FARS stored therein and executable through processor 402; safety engine 406 may integrate with environment sensors $302_{1-B}$ (and all other sensors within safety system 100) based on execution thereof through processor 402.

FIG. 4 shows memory 404 as including data (e.g., detected, sensed; environmental parameters 304) from one or more components of safety system 100; the limited amount of data shown must not be considered as limiting the scope of the exemplary embodiments discussed herein. In one or more embodiments, safety engine 406 may have one or more predictive and/or non-predictive algorithms (e.g., predictive and/or non-predictive algorithms 408) including Artificial Intelligence (AI)/Machine Learning (ML) based algorithms stored therein and executable through processor 402.

In one or more embodiments, execution of predictive and/or non-predictive algorithms 408 through processor 402 may involve taking the abovementioned data and providing analyses and/or recommendations, as discussed above. It should be noted that each of the aforementioned data (e.g., environmental parameters 304) may be real-time data from elements/components of safety system 100. In one or more embodiments, analyses of the data and recommendations may result in increased situational awareness during emergencies/maintenance situations and improved efficiency with regard to safety system 100 and safety/security thereof.

Figure 5:
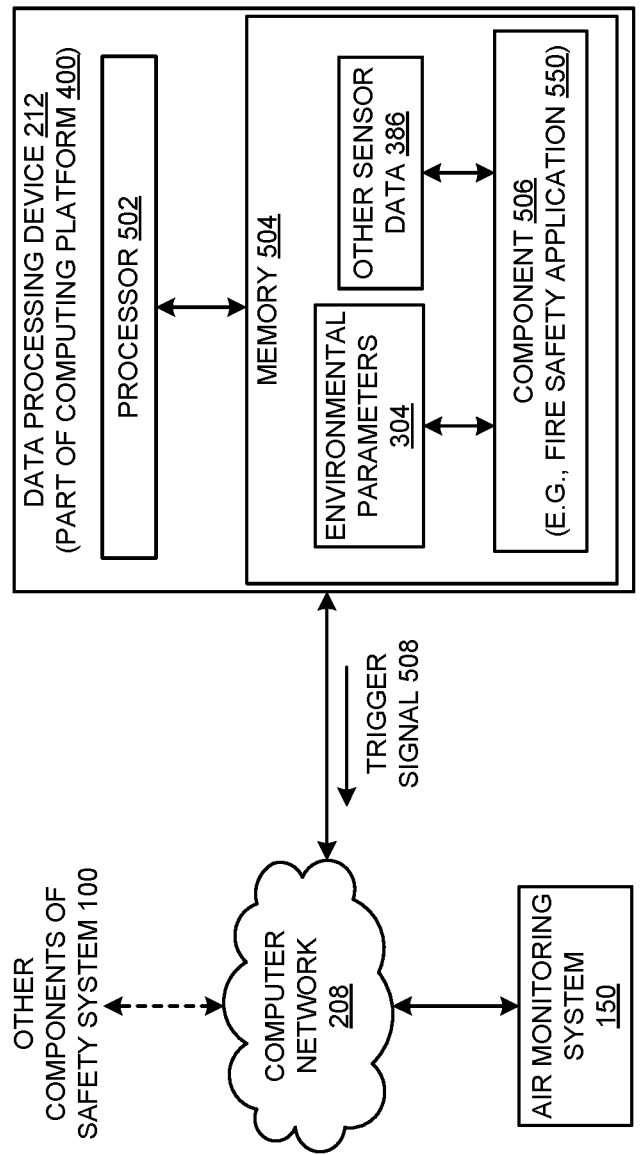
FIG. 5 is a schematic view of a data processing device of FIGS. 2-4, according to one or more embodiments.

In one or more implementations, the components (e.g., emergency air fill station $120_{1-P}$, air storage system 106, air monitoring system 150) of safety system 100 may automatically transmit data (e.g., environmental parameters 304) thereof to server 210; server 210 may transmit trigger signals (e.g., trigger signal 410) therefor. FIG. 5 shows data processing device 212 (e.g., a mobile phone, a tablet, a smart device, a laptop) in detail, according to one or more embodiments. In one or more embodiments, again, data processing device 212 may include a processor 502 (e.g., a single processor, a processor core) communicatively coupled to a memory 504 (e.g., a volatile and/or a non-volatile memory). In one or more embodiments, memory 504 may include a component 506 of safety engine 406 stored therein and enabled/provided through processor 402 of server 210. FIG. 5 shows component 506 as a fire safety application 550 merely for example purposes. Again, in one or more embodiments, access to the data of one or more components of safety system 100 may be available to data processing device 212 via component 506 (e.g., through computer network 208 via safety engine 406 of server 210). FIG. 5 also shows capabilities to control components of safety system 100 through data processing device 212 via trigger signals; FIG. 5 specifically shows a trigger signal 508 to initiate collection of data from air monitoring system 150 merely for example purposes. Again, in some implementations, data may be automatically communicated to data processing device 212 and in some others, data processing device 212 may trigger (e.g., through trigger signal 508) collection thereof.

Referring back to FIG. 3, each camera device 308 may be a programmable device to capture and record visual incidents and/or audio communications in external environment 350. In some implementations, camera devices 308 may be integrated with TICs 310; in some other implementations, camera devices 308 may be distinct from TICs 310; further, in some other implementations, camera devices 308 may be the same as TICs 310. In some embodiments, one or more camera devices 308 may include motion sensor(s) (e.g., example environment sensors $302_{1-B}$) and/or facial recognition algorithms programmed therein to detect visual incidents such as tampering of emergency air fill station $120_{1-P}$ (and, analogously, other components of safety system 100).

FIG. 3 illustrates a fire as an example emergency event 370. In this context, a temperature of external environment 350 may exceed a threshold value thereof. The ambient temperature of external environment 350 may be detected by one or more environment sensors $302_{1-B}$. As part of determining/detecting emergency event 370, processor 372 may determine that the temperature sensed through the one or more environment sensors $302_{1-B}$ exceeds the threshold value thereof to automatically activate one or more camera devices 308 to capture visual incidents and/or audio communication in external environment 350 associated with emergency event 370. FIG. 3 shows visual incident data 312 (e.g., images and/or video frames, a video sequence) and audio communication data 314 (e.g., audio accompanying visual incident data 312, separate audio data) being stored in memory 374 based on the capturing thereof through the one or more camera devices 308. It should be noted that memory 374 and/or processor 372 may even be part of the one or more camera devices 308.

In another scenario, environment sensors $302_{1\text{-}B}$ may include an audio level sensor to detect an ambient decibel level of audio/sound in external environment 350. Here, emergency event 370 may involve emergency personnel 122 or a potential victim screaming "Fire!" The aforementioned scream may cause a decibel level of the ambient sound to exceed a threshold value thereof; processor 372 may determine that the ambient decibel level is in excess of the threshold value thereof to automatically activate the one or more camera devices 308 (and/or TICs 310) discussed above to capture visual incident data 312 and audio communication data 314. In more sophisticated implementations, processor 372 may execute algorithms to glean emergency event 370 from an interpretation of audio communication data 314 in real-time; alternatively or additionally, audio communication data 314 and/or visual incident data 312 may be transmitted to server 210 and server 210 may glean emergency event 370 based on executing safety engine 406 to remotely activate the one or more camera devices 308 discussed above. It should be noted that the same remote operation may be performed through data processing device 212 based on executing component 506.

In one or more embodiments, emergency event 370 may include but is not limited to a fire hazard, an explosion, a smoke situation, a terrorist attack, tampering of one or more components of safety system 100, air pollution in external environment 350, increased hazardous components in breathable air 103, and reduced pressure of breathable air 103. In some implementations, emergency event 370 may even be a maintenance event or a simulated event (e.g., part of a demonstration of safety system 100 and/or one or more components thereof) based on triggering (e.g., through server 210, data processing device 212) environment sensors $302_{1\text{-}B}$ to detect anomalous environmental parameters 304 and/or processor 372 appropriately. Thus, environment sensors $302_{1\text{-}B}$ may also encompass internal pressure sensors configured to sense pressure of breathable air 103 and air component level sensors configured to sense levels of hazardous components of breathable air 103. FIG. 3 shows threshold values 380 used by processor 372 to determine emergency event 370 based on comparison of environmental parameters 304 with threshold values 380; based on the determination, processor 372 may automatically activate (e.g., based on transmitting a control signal 382 to the one or more camera devices 308) the one or more camera devices 308 discussed above.

In one or more embodiments, camera devices 308 (and TICs 310) may employ advanced night vision to capture visual incident data 312 during conditions of low visibility. In some implementations, one or more camera devices 308 may employ 360 degree pan-tilt-zoom (PTZ) features to enable emergency personnel 122 at server 210 and/or data processing device 212 to remotely control a movement and/or positioning (movement and/or positioning are merely two example camera device parameters) of the one or more camera devices 308 based on control signals therefor. Additionally, in one or more embodiments, the one or more camera devices 308 may transmit alert notifications (e.g., alert notifications 384 stored in memory 374) to server 210 and/or data processing device 212 related to alerting server 210 and/or data processing device 212 (e.g., through component 506) of emergency event 370.

Referring back to FIG. 4, server 210 may also store visual incident data 312 and audio communication data 314 in memory 404 for analyses thereof (to be discussed herein). For the aforementioned purpose, server 210 may also leverage cloud storage through computer network 208. In one or more implementations, environment sensors $302_{1\text{-}B}$ may be configured to detect environmental parameters 304 at all times and the one or more camera devices 308 discussed above may be activated solely during emergency event 370 to provide situational context to emergency personnel 122 at server 210 and/or data processing device 212 and/or personnel (e.g., authorized, unauthorized) within structure 100 in external environment 350. In one or more embodiments, predictive and/or non-predictive algorithms 408 executing as part of safety engine 406 on server 210 may even take visual incident data 312 and/or audio communication data 314 to generate a transcript (e.g., transcript data 422) thereof. Alternatively, transcript data 422 may be created based on leveraging cloud capabilities/services by server 210. In some implementations, processor 372 may itself generate transcript data 422.

As discussed above, in one or more embodiments, environmental parameters 304 may also be transmitted to server 210 and/or data processing device 212 for analysis thereat. In some implementations, predictive and/or non-predictive algorithms 408 executing on server 210 may analyze environmental parameters 304 and other sensor data 386 (in FIG. 3; e.g., data collected by environment sensors $302_{1\text{-}B}$) to provide device renderable recommendations (e.g., device renderable recommendation data 412 shown stored in memory 404 of server 210). Recommendation data 412 may be associated with but may not be limited to preventive measures to control the fire discussed above as emergency event 370, optimizing resources, directing emergency personnel 122 via data processing device 212 (or one or more audio/video devices (e.g., a public speaker system) within safety system 100) across safety system 100 and generating an emergency map for effective evacuation of victims. Recommendation data 412 and/or transcript data 422, in some implementations, may be generated at data processing device 212 based on execution of component 506 thereon.

Figure 6:
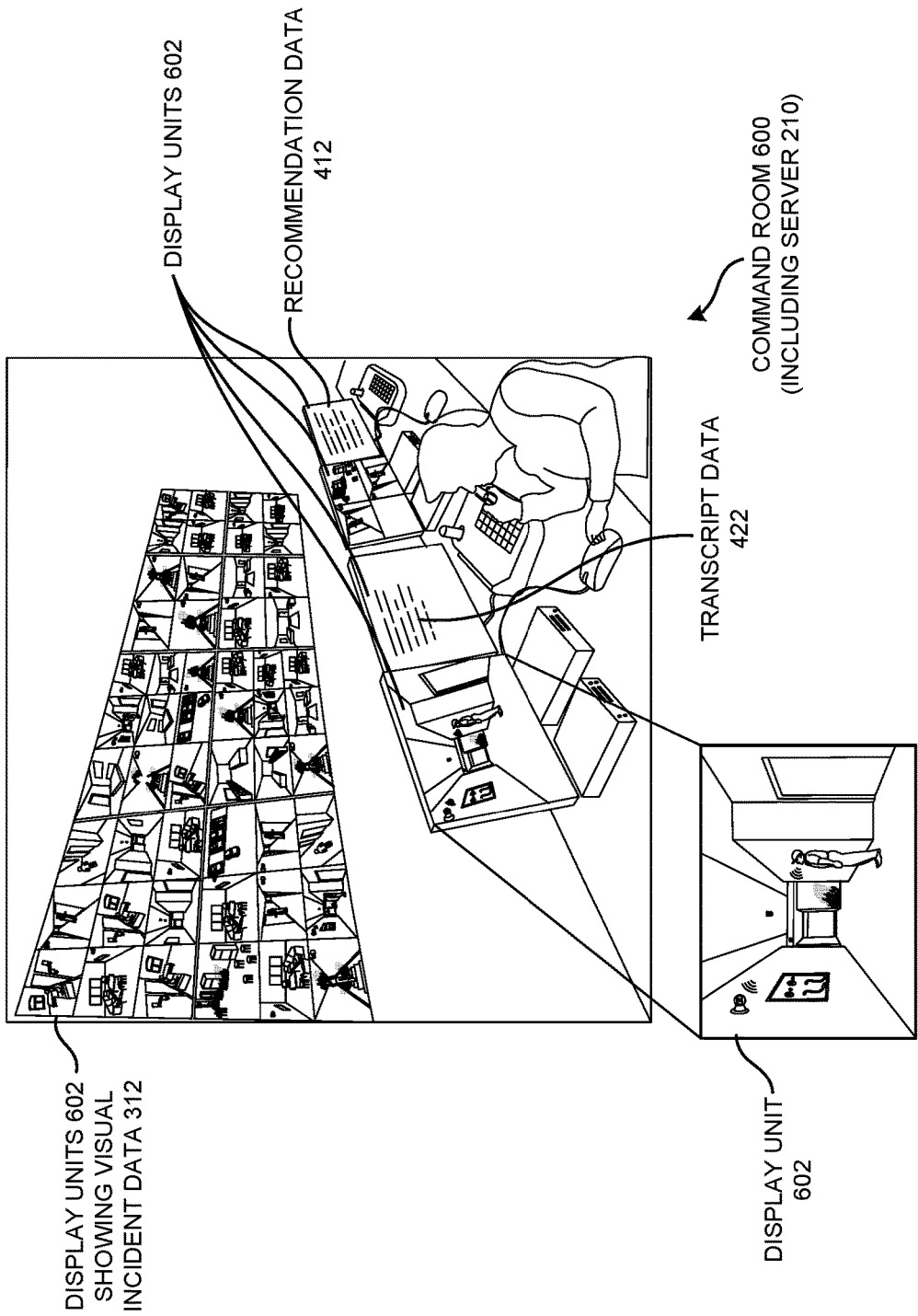
FIG. 6 is an illustrative view of a command room of the safety system of FIGS. 1-2.

FIG. 6 shows an example command room 600 implementation of server 210. Here, server 210 may have a number of display units 602 associated therewith to view visual incident data 312 captured by the one or more camera devices 308 in real-time. In addition, one or more display units 602 may include audio rendering devices (not shown) thereon to render audio communication data 314 in real-time. Further, the one or more display units 602 may display transcript data 422 and/or recommendation data 412 discussed above. Referring back to FIG. 3, during emergency event 370, the one or more camera devices 308, in conjunction with processor 372 and/or remote communication from server 210/data processing device 212, may activate an audio alarm device 388 (e.g., rendering pre-recorded sound, rendering an audio message) to apprise emergency personnel 122/other personnel within structure 102, at server 210, at data processing device 212 and/or within command room 600 of emergency event 370. In one or more embodiments, the one or more camera devices 308 discussed above may have a backup battery power source 390 associated therewith to supply interrupted power thereto during emergency event 370 (e.g., associated with power interruption).

Figure 7:
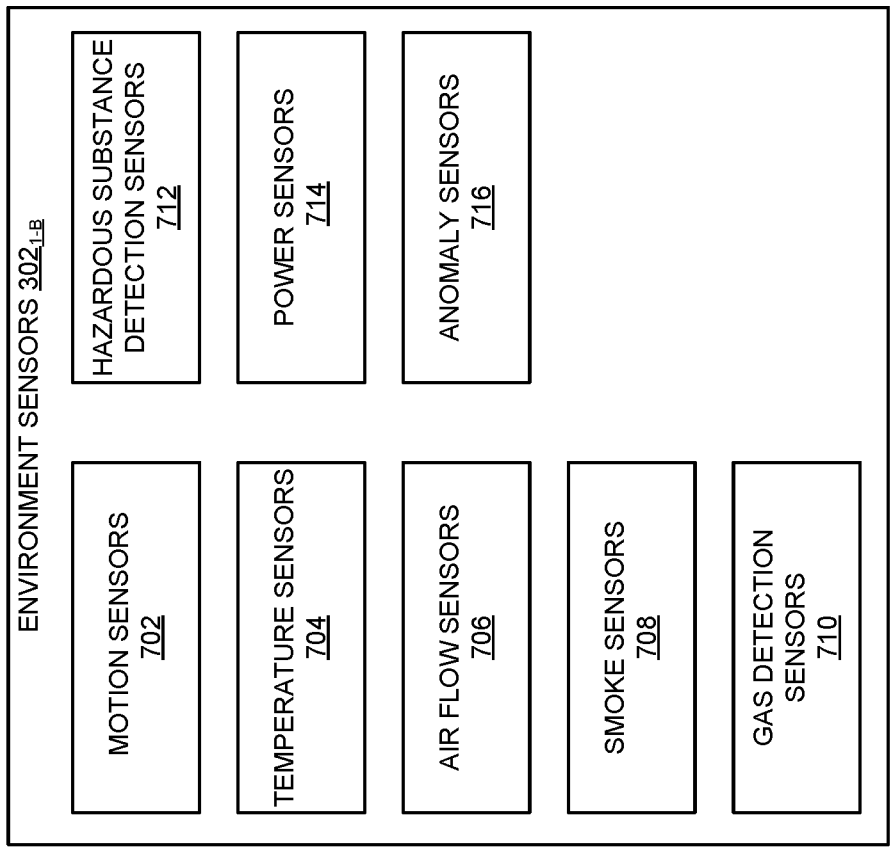
FIG. 7 is a schematic view of example environment sensors of the emergency air fill station of FIG. 3.
Figure 8:
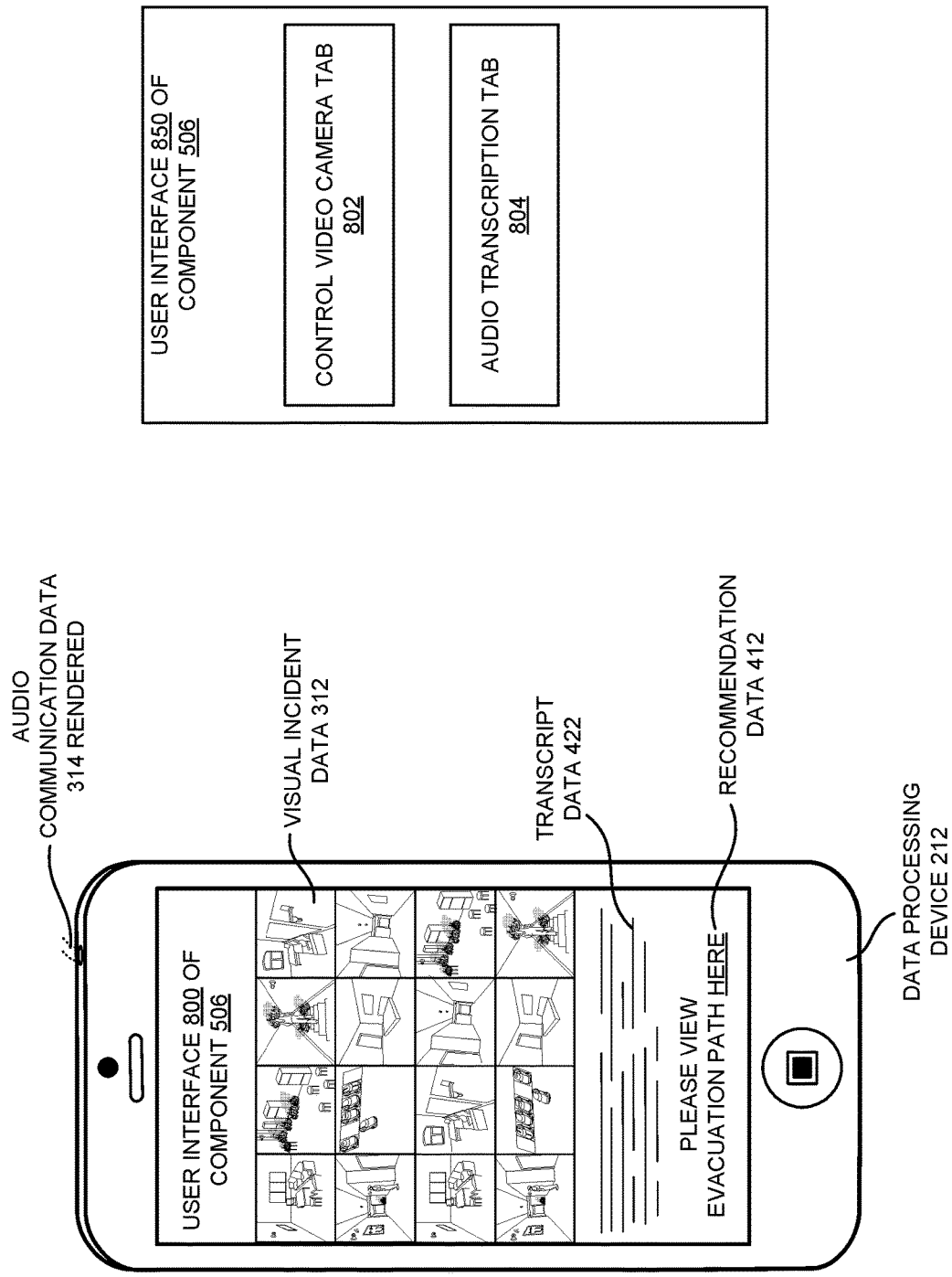
FIG. 8 is an example user interface view of a component of the data processing device of FIGS. 2-5.

FIG. 7 shows examples of environment sensors $302_{1\text{-}B}$. As seen in FIG. 7, environment sensors $302_{1\text{-}B}$ may include but are not limited to motion sensors 702, a temperature sensor 704, air flow sensors 706, smoke sensors 708, gas detection sensors 710, hazardous substance detection sensors 712, power sensors 714 and anomaly sensors 716 (e.g., sensing malfunctioning of equipment). FIG. 8 shows visual incident data 312 and audio communication data 314 being rendered via component 506 (e.g., fire safety application 550) executing on data processing device 212. Again, transcript data 422 and/or recommendation data 412 may be rendered via a user interface 800 of component 506. Emergency personnel 122 may control (e.g., through control video camera tab 802) the one or more camera devices 308 discussed above and transcribe (e.g., using audio transcription tab 804) audio communication data 314 via another user interface 850 of component 506.

Thus, exemplary embodiments discussed herein may serve as an advance surveillance system implemented as part of safety system 100. The capabilities discussed herein may enable safety system 100 to provide better situational awareness to emergency personnel 122 at server 210, control room 600, data processing device 122 and/or other personnel within structure 102. Further, in one or more embodiments, safety system 100 discussed herein may provide for efficient contextual monitoring of safety system 100 and transmitting actionable recommendations viewable, hearable and/or readable by emergency personnel 122/other personnel within structure 102. It should be noted that all operations and/or functionalities discussed herein may be performed through one or processors (e.g., processor 372, processor 402, processor 502) of one or more data processing devices (e.g., emergency air fill station $120_{1-P}$, server 210, data processing device 212) of safety system 100 discussed above in conjunction with one or more other elements (e.g., environment sensors $302_{1-B}$).

Also, it should be noted that both component 506 and safety engine 406 may be regarded as a computing platform analogous to computing platform 400 based on capabilities (e.g., including integration capabilities) provided thereto. Further, it should be noted that environment sensors $302_{1-B}$ may not only sense parameters relevant to external environment 350 but also sense internal parameters relevant to emergency air fill station $120_{1-P}$. The same discussion may analogously be applicable to other components of safety system 100 (e.g., air monitoring system 150, air storage system 106, isolation and bypass control system 202, backup power unit 204). Last but not the least, emergency event 370 discussed above may be generalized to detection of any incident (e.g., a real-time incident determined based on environmental parameters 304). All reasonable variations are within the scope of the exemplary embodiments discussed herein.

Figure 9:
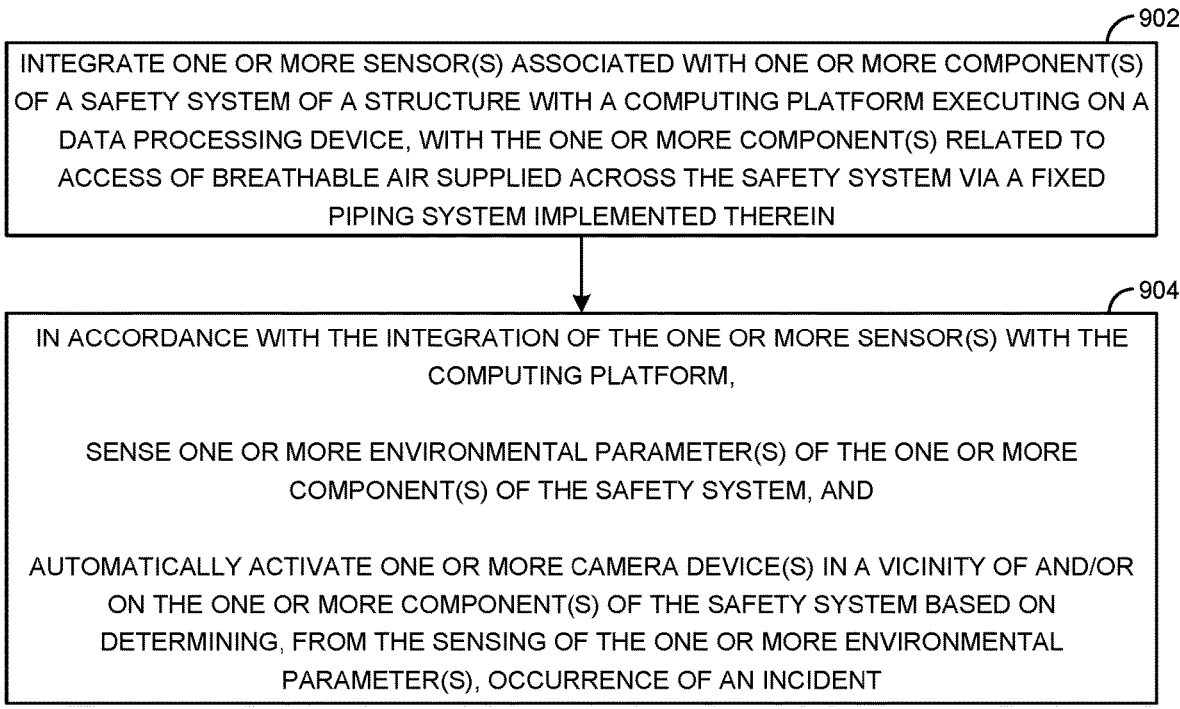
FIG. 9 is a process flow diagram detailing the operations involved in incident based camera device activation in a safety system of a structure having breathable air supplied therein, according to one or more embodiments.

FIG. 9 shows a process flow diagram detailing the operations involved in incident based camera device activation in a safety system (e.g., safety system 100) of a structure (e.g., structure 102) having breathable air (e.g., breathable air 103) supplied therein via a fixed piping system (e.g., fixed piping system 104), according to one or more embodiments. In one or more embodiments, operation 902 may involve integrating one or more sensor(s) (e.g., environment sensors $302_{1-B}$) associated with one or more component(s) (e.g., emergency air fill station $120_{1-P}$, air monitoring system 150, air storage system 106, isolation and bypass control system 202) of the safety system with a computing platform (e.g., safety engine 406, component 506) executing on a data processing device (e.g., server 210, data processing device 212). In one or more embodiments, the one or more component(s) may relate to access of the breathable air within the safety system.

In one or more embodiments, operation 904 may then involve, in accordance with the integration of the one or more sensor(s) with the computing platform, sensing one or more environmental parameter(s) (e.g., environmental parameters 304) of the one or more component(s) of the safety system, and automatically activating one or more camera device(s) (e.g., camera devices 308) in a vicinity (e.g., in external environment 350) of and/or on the one or more component(s) of the safety system based on determining, from the sensing of the one or more environmental parameter(s), occurrence of an incident (e.g., emergency event 370).

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A method of a safety system of a structure having a fixed piping system implemented therein to supply breathable air thereacross, comprising:
    integrating at least one sensor associated with at least one component of the safety system with a computing platform executing on a data processing device, the at least one component related to access of the breathable air within the safety system; and
    in accordance with the integration of the at least one sensor with the computing platform,
        sensing at least one environmental parameter of the at least one component of the safety system, wherein the at least one environmental parameter includes pressure, smoke, motion, audio detection, temperature, or ambient light;
        determining, from the sensing of the at least one environmental parameter, an occurrence of an incident corresponding to the at least one environmental parameter; and
        automatically activating at least one camera device in a vicinity of the at least one environmental parameter and on the at least one component of the safety system responsive to the occurrence of the incident.

2. The method of claim 1, further comprising capturing, through the automatically activated at least one camera device, at least one of: visual data and audio data of the incident.

3. The method of claim 2, further comprising generating, through at least one of: the data processing device and another data processing device communicatively coupled to the data processing device through a computer network, at least one of:

a transcript of the at least one of: the visual data and the audio data based on executing a corresponding at least one of: the computing platform and a component of the computing platform, and a device renderable recommendation in a situational awareness context of the incident based on analysis of at least one of: the visual data, the audio data and the sensed at least one environmental parameter.

4. The method of claim 1, further comprising automatically activating at least one Thermal Imaging Camera (TIC) one of: as part of and in addition to the automatic activation of the at least one camera device based on the determination of the occurrence of the incident.

5. The method of claim 1, comprising determining the occurrence of the incident based on determining, through a processor associated with at least one of: the at least one sensor and the data processing device, that the sensed at least one environmental parameter exceeds a threshold value thereof.

6. The method of claim 1, comprising the at least one component of the safety system being Internet of Things (IoT) enabled.

7. The method of claim 1, comprising sensing a parameter related to access of the at least one component of the safety system as the at least one environmental parameter.

8. A safety system of a structure having a fixed piping system implemented therein to supply breathable air thereacross, comprising:

at least one component related to access of the breathable air within the safety system;

at least one sensor associated with the at least one component; and a data processing device executing a computing platform thereon to integrate the at least one sensor with the computing platform, wherein, in accordance with the integration of the at least one sensor with the computing platform, the at least one sensor senses at least one environmental parameter of the at least one component, wherein the at least one environmental parameter includes pressure, smoke, motion, audio detection, temperature, or ambient light, and a processor associated with the at least one sensor to:

determine, from the sensing of the at least one environmental parameter, an occurrence of an incident corresponding to the at least one environmental parameter; and automatically activate at least one camera device in a vicinity of the at least one environmental parameter and on the at least one component of the safety system, responsive to the occurrence of the incident.

9. The safety system of claim 8, wherein the automatically activated at least one camera device captures at least one of: visual data and audio data of the incident.

10. The safety system of claim 9, wherein at least one of: the data processing device and another data processing device communicatively coupled to the data processing device through a computer network generates at least one of:

a transcript of the at least one of: the visual data and the audio data based on executing a corresponding at least one of: the computing platform and a component of the computing platform, and a device renderable recommendation in a situational awareness context of the incident based on analysis of at least one of: the visual data, the audio data and the sensed at least one environmental parameter.

11. The safety system of claim 8, wherein at least one of: the processor associated with the at least one sensor is related to one of: the at least one component and the data processing device, and wherein the processor automatically activates at least one TIC one of: as part of and in addition to the automatic activation of the at least one camera device based on the determination of the occurrence of the incident.

12. The safety system of claim 8, wherein the processor associated with the at least one sensor determines the occurrence of the incident based on determining that the sensed at least one environmental parameter exceeds a threshold value thereof.

13. The safety system of claim 8, wherein the at least one component is IoT enabled.

14. The safety system of claim 8, wherein the at least one sensor senses a parameter related to access of the at least one component of the safety system as the at least one environmental parameter.

15. A method of a safety system of a structure having a fixed piping system implemented therein to supply breathable air thereacross, comprising:

integrating at least one sensor associated with at least one component of the safety system with a computing platform executing on a data processing device, the at least one component related to access of the breathable air within the safety system;

in accordance with the integration of the at least one sensor with the computing platform, sensing at least one environmental parameter of the at least one component of the safety system, wherein the at least one environmental parameter includes pressure, smoke, motion, audio detection, temperature, or ambient light;

determining, from the sensing of the at least one environmental parameter, an occurrence of an incident corresponding to the at least one environmental parameter, and automatically activating at least one camera device in a vicinity of the at least one environmental parameter and on the at least one component of the safety system responsive to the occurrence of the incident; and in accordance with the automatic activation of the at least one camera device, capturing at least one of: visual data and audio data of the incident.

16. The method of claim 15, further comprising generating, through at least one of: the data processing device and another data processing device communicatively coupled to the data processing device through a computer network, at least one of:

a transcript of the at least one of: the visual data and the audio data based on executing a corresponding at least one of: the computing platform and a component of the computing platform, and a device renderable recommendation in a situational awareness context of the incident based on analysis of at least one of: the visual data, the audio data and the sensed at least one environmental parameter.

17. The method of claim 15, further comprising automatically activating at least one TIC one of: as part of and in addition to the automatic activation of the at least one camera device based on the determination of the occurrence of the incident.

18. The method of claim 15, comprising determining the occurrence of the incident based on determining, through a processor associated with at least one of: the at least one sensor and the data processing device, that the sensed at least one environmental parameter exceeds a threshold value thereof.

19. The method of claim 15, comprising the at least one component of the safety system being IoT enabled.

20. The method of claim 15, comprising sensing a parameter related to access of the at least one component of the safety system as the at least one environmental parameter.

* * * * *